(12) United States Patent
Kikuchi et al.

(10) Patent No.: US 6,862,383 B2
(45) Date of Patent: Mar. 1, 2005

(54) ARRAYED OPTICAL DEVICE

(75) Inventors: Juro Kikuchi, Kubo Kakegawa (JP);
Yasuyuki Mizushima, Kakegawa (JP);
Hiroki Takahashi, Fukuroi (JP);
Yoshiaki Takeuchi, Shizuoka (JP)

(73) Assignee: Osaki Electric Co., Ltd., Tokyo (JP)

( * ) Notice: Subject to any disclaimer, the term of this patent is extended or adjusted under 35 U.S.C. 154(b) by 478 days.

(21) Appl. No.: 09/810,928

(22) Filed: Mar. 15, 2001

(65) Prior Publication Data
US 2002/0097957 A1 Jul. 25, 2002

Related U.S. Application Data

(63) Continuation-in-part of application No. 09/767,255, filed on Jan. 22, 2001.

(51) Int. Cl.[7] ................................................. G02B 6/32
(52) U.S. Cl. ............................. 385/33; 385/34; 385/39
(58) Field of Search ............................. 385/31, 33–35, 385/39, 51, 78, 80, 85, 89, 93, 59, 70–74

(56) References Cited

U.S. PATENT DOCUMENTS

| | | | |
|---|---|---|---|
| 5,446,815 A | * 8/1995 | Ota et al. .................... 385/33 |
| 5,701,375 A | * 12/1997 | Duck et al. .................... 385/74 |
| 5,706,371 A | * 1/1998 | Pan .............................. 385/11 |
| 5,815,624 A | 9/1998 | Rosenberg | |
| 6,010,251 A | 1/2000 | Koyanagi et al. | |
| 6,012,852 A | * 1/2000 | Kadar-Kallen et al. ........ 385/74 |
| 6,122,303 A | * 9/2000 | Major, Jr. ..................... 372/45 |
| 6,142,678 A | 11/2000 | Cheng | |
| 6,168,319 B1 | 1/2001 | Francis | |
| 6,263,133 B1 | 7/2001 | Hamm | |
| 6,282,333 B1 | * 8/2001 | Dultz et al. .................... 385/11 |
| 6,304,694 B1 | 10/2001 | Ford | |
| 6,328,482 B1 | 12/2001 | Jian | |
| 6,393,179 B1 | 5/2002 | Cheng et al. | |
| 6,470,126 B1 | * 10/2002 | Mukasa ....................... 385/123 |
| 2003/0138210 A1 | * 7/2003 | Steinberg et al. ............. 385/38 |

* cited by examiner

Primary Examiner—Akm Enayet Ullah
Assistant Examiner—Sarah U Song
(74) Attorney, Agent, or Firm—Collard & Roe, P.C.

(57) ABSTRACT

An arrayed optical device includes a first optical fiber collimator array, a second optical fiber collimator array and an optical chip. The first optical fiber collimator array includes a first optical fiber array block and a first microlens array substrate. The second optical fiber collimator array includes a second optical fiber array block and a second microlens array substrate. The optical chip is coupled between the first microlens array substrate and the second microlens array substrate.

15 Claims, 17 Drawing Sheets

ARRAYED OPTICAL DEVICE

CROSS-REFERENCE TO RELATED APPLICATION

This application is a continuation-in-part of U.S. patent application Ser. No. 09/767,255, entitled "FIBER COLLIMATOR ARRAY," filed Jan. 22, 2001, the disclosure of which is hereby incorporated by reference.

BACKGROUND OF THE INVENTION

1. Field of the Invention

The present invention is generally directed to an arrayed optical device and, more specifically, to an arrayed in-line optical device for use in an optical transmission system and/or an optical sensor system.

2. Technical Background

Optical isolators have been utilized in a variety of optical systems to reduce reflections that can have an adverse effect on the operation of the systems, such as disruption of the oscillation of a laser and interference with in-line optical amplifiers. Known optical isolators have implemented a wide variety of components to achieve optical isolation. Normally, in-line optical isolators have polarization independent properties and have utilized birefringent crystal plates (e.g., rutiles), half-wave plates and latching garnets or non-latching garnets with external magnets, for example.

Optical circulators have also been utilized in a variety of optical systems to, for example, couple a bidirectional fiber to both an input fiber and an output fiber. Known optical circulators have also generally exhibited polarization independent properties and have also utilized birefringent crystal plates (e.g., rutiles), half-wave plates and latching garnets or non-latching garnets with external magnets, for example.

A rutile is a birefringent material that typically divides a light ray into at least two orthogonal rays (i.e., an ordinary ray and an extraordinary ray). When implemented in an optical isolator or an optical circulator, at least one rutile normally functions as a walk-off element, with a first rutile typically splitting an incoming optical signal into ordinary and extraordinary component beams and a last (e.g., a second) rutile normally causing the two separate beams to become coincident and reform the original incoming optical signal. When utilized in optical isolators and optical circulators, a latching garnet non-reciprocally rotates the component beams of an input signal, typically, by forty-five degrees and a half-wave plate is generally used to reciprocally rotate the component beams an additional forty-five degrees.

Optical collimators have also been utilized in conjunction with optical isolators and optical circulators. As is well known, a collimator functions to convert divergent beams of radiation or particles (e.g., light rays) into parallel beams. Laser diode (LD) collimating lenses are commonly used in laser beam printers, bar code scanners and sensors. In addition, fiber collimators are widely used in a variety of optical applications (e.g., optical filters). However, commercially available fiber collimator arrays have typically implemented separate lenses, which has increased the cost of the array. For example, one commercially available collimator array has utilized a V-groove array substrate with individually aligned graded-index (GRIN) microlenses and fibers in each V-groove. These GRIN microlenses have generally been produced by an ion-exchange process and normally provide high coupling efficiency and have been utilized as collimators for laser beam printers, bar code scanners, optical isolators, optical circulators and digital versatile disc (DVD) players, as well as miniature objective lenses for medical/industrial endoscopes.

Planar microlens arrays (PMLAs) are one or two dimensional lens arrays formed on a substrate and may include numerous microscopic lenses in various sizes and patterns. Commercially available PMLAs are usually graded-index (GRIN), aspheric or Fresnel lenses. PMLAs have been used in liquid crystal projectors and proposed for use in three dimensional data processing and one or two dimensional laser diode (LD) coupling to fibers.

Due to the recent increase in demand for optical isolators and optical circulators, to be used with dense wavelength division multiplexing (DWDM) systems, reducing the optical isolator and the optical circulator cost has become increasingly important. In general, arrayed configuration is considered as one of the solutions for cost-effective fabrication of optical isolators and optical circulators. However, the effectiveness of optical isolators and optical circulators that use collimating arrays incorporating GRIN, aspheric or Fresnel collimating microlenses, are highly dependent on the configuration of the fiber collimator array and optical isolator or circulator chip. As such, it is important to configure the fiber collimator array and to construct the isolator chip to have superior isolation properties. Further, it is important to configure the fiber collimator array and to construct the circulator chip to have superior properties as a circulator.

SUMMARY OF THE INVENTION

The present invention is directed to an arrayed optical device that includes a first optical fiber collimator array, a second optical fiber collimator array and an optical chip. The first optical fiber collimator array includes a first optical fiber array block and a first microlens array substrate. The first optical fiber array block includes a first block surface and is configured to receive and retain a first plurality of individual optical fibers, which carry optical signals. The first microlens array substrate is coupled to the first optical fiber array block. The first microlens array substrate includes a first plurality of microlenses integrated along a first microlens surface and a first substrate surface opposite the first microlens surface. The optical signals from the first plurality of individual optical fibers are each collimated by a different one of the first plurality of integrated microlenses.

The second optical fiber collimator array includes a second optical fiber array block and a second microlens array substrate. The second optical fiber array block includes a second block surface and is configured to receive and retain a second plurality of individual optical fibers, which carry the optical signals. The second microlens array substrate is coupled to the second optical fiber array block and includes a second plurality of microlenses integrated along a second microlens surface and a second substrate surface opposite the second microlens surface. The optical signals provided to the second plurality of individual optical fibers are each provided by a different one of the second plurality of integrated microlenses. The optical chip is coupled between the first microlens array substrate and the second microlens array substrate and includes a first chip surface and a second chip surface.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENT(S)

The present invention is directed to an arrayed optical device that includes two optical fiber collimator arrays and an optical chip (e.g., an optical circulator chip or an optical isolator chip). In one embodiment, each collimator array includes a microlens array substrate, a spacer (i.e., a lens spacer) and an optical fiber array block that are configured to reduce insertion loss and to reduce internal reflections. Each microlens is preferably a graded-index (GRIN) lens, a refractive lens or a diffractive lens depending upon the specific implementation. Commercially available optical fiber array blocks typically have a pitch of either two-hundred fifty microns or one-hundred twenty-seven microns. However, optical fiber array blocks with other pitches may be utilized (e.g., 125 to 2500 microns). It should be appreciated that the pitch of the fiber array block limits the microlens diameter, which may limit the coupling efficiency of the lens since the modefield diameter of the optical power (of the optical signal) in the microlens plane is limited by the microlens diameter.

To reduce coupling loss to less than 0.01 dB, theoretically, the modefield diameter should typically be less than half the effective microlens diameter. As such, when a GRIN lens with a pitch of two-hundred fifty microns is used, the modefield diameter should be less than about one-hundred ten microns since the effective lens diameter is typically less than ninety percent of the physical lens diameter. While a larger collimated beam diameter is preferable in order to get higher coupling efficiency, at typical working distances over a few millimeters, in practical use the modefield diameter limits the diameter of the collimated optical beam. As such, the dimensions of the fiber collimator array, including the optical fiber array block and the microlens array substrate, are limited. Preferably, the modefield diameter of an optical signal on a microlens plane is set to about one-hundred ten microns, when a commercially available fiber array block with a fiber pitch of two-hundred fifty microns is used. Various embodiments of an arrayed optical device of the present invention are depicted in FIGS. 1A–10. These figures, which are not to scale, are provided to aid in the comprehension of the subject matter, disclosed herein, and are not intended to be limiting. Certain component features (e.g., dimensions and angles) of FIGS. 1A–10 have been exaggerated for the sake of clarity.

Figure 1A:
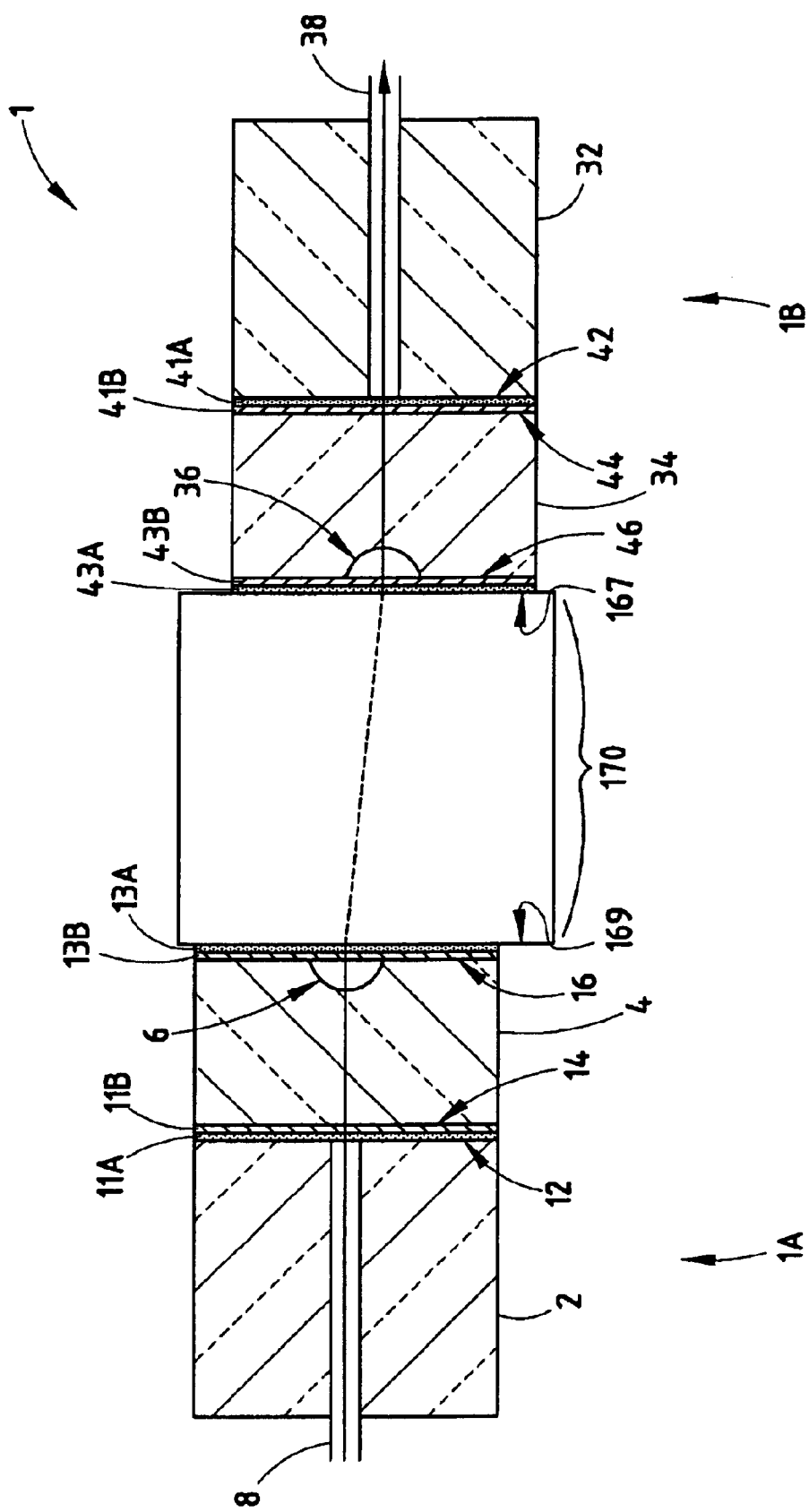
FIG. 1A is a cross-sectional view of an arrayed optical device, according to one embodiment of the present invention.

As shown in FIG. 1A, an optical chip 170 (see FIGS. 2A–2C) is coupled (with an index-matched optical adhesive 13A and 43A, for example) between a pair of optical fiber collimator arrays 1A and 1B to form an arrayed optical device 1, after active optical alignment between the fiber collimator array 1A and the optical chip 170 and the fiber collimator array 1B. All surfaces of the device 1, that an optical beam crosses, are substantially perpendicular to the optical beam axis and to the optical axes of each microlens 6 and 36. The optical chip 170 maybe of various types including: an optical isolator chip 170' (see FIG. 2A); an optical circulator chip 170" (see FIGS. 2B–2C); a gain flattening filter; a thin film filter; a variable optical attenuator; a polarization beam splitter; a wavelength plate; a prism; a grating; a mirror; a dynamically adjustable optical chip that includes active optical materials, such as, polycrystalline lanthanum-modified lead titanate zirconate (PLZT), nonlinear polymers, electro-optic polymers and electro-optic inorganic materials; polarizing material for polarization modification of an input optical signal; or any of a variety of optical materials that are useful in an arrayed configuration.

In the arrays 1A and 1B, optical fiber array blocks 2 and 32 retain a plurality of optical fibers 8 and 38, respectively. The blocks 2 and 32 include block surfaces 12 and 42, respectively, that are coupled (e.g., with index-matched optical adhesives 11A and 41A, respectively) to substrate surfaces 14 and 44 of microlens array substrates 4 and 34, after active optical alignment to adjust the relative positions of the elements such that optical beams from the fibers 8 and 38 coincide with the optical axes of each of the microlenses 6 and 36, respectively.

As shown, the microlens array substrates 4 and 34 are planar graded-index (GRIN) microlens array substrates that include a plurality of GRIN microlenses 6 and 36, respectively, which are spaced such that each microlens 6/36 receives/provides an optical signal from/to one of the optical fibers 8/38, when the device 1 is configured as an arrayed optical isolator. If desired, an AR coating 13B and 43B may also be provided on a microlens surface 16 and 46 of the substrates 4 and 34, respectively.

The structure of the surfaces 12 and 42 of the blocks 2 and 32 and the microlens surfaces 16 and 46 are, preferably, symmetrical. The plurality of optical fibers 8 and 38 are preferably positioned at the center of the surfaces 12 and 42. The plurality of microlenses 6 and 36 are preferably positioned at the center of the microlens surfaces 16 and 46, respectively. The coefficient of thermal expansion (CTE) of the optical fiber array blocks 2 and 32 are preferably similar to that of the microlens substrates 4 and 34.

Figure 1B:
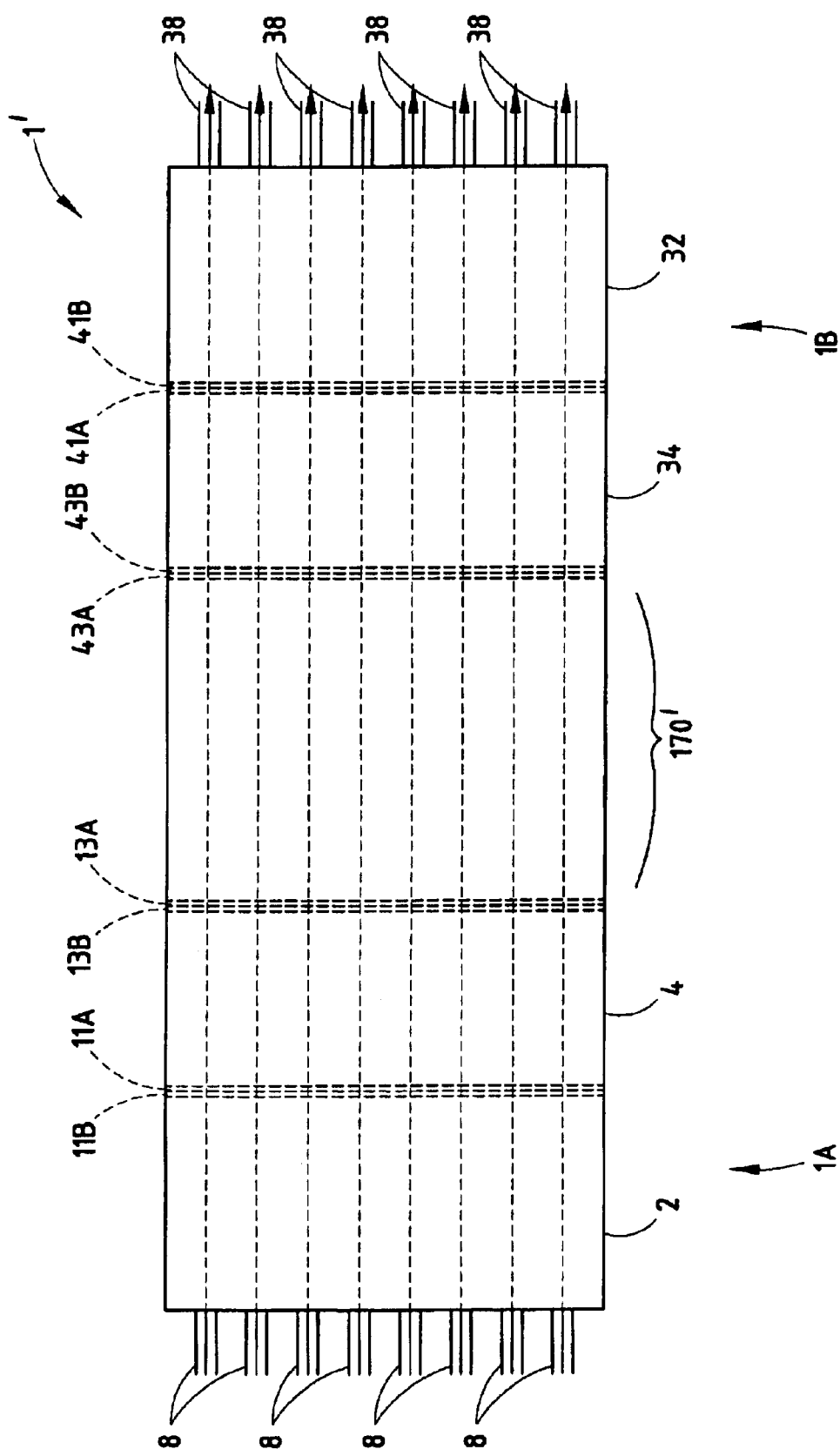
FIG. 1B is a top plan view of the arrayed optical device of FIG. 1A, when implemented as an arrayed optical isolator.

FIG. 1B illustrates a top view of an arrayed optical isolator 1' that implements an optical isolator chip 170' (see FIG. 2A), according to one embodiment of the present invention. As shown in FIG. 1B, the arrayed optical isolator 1' includes eight channels.

Figure 1C:
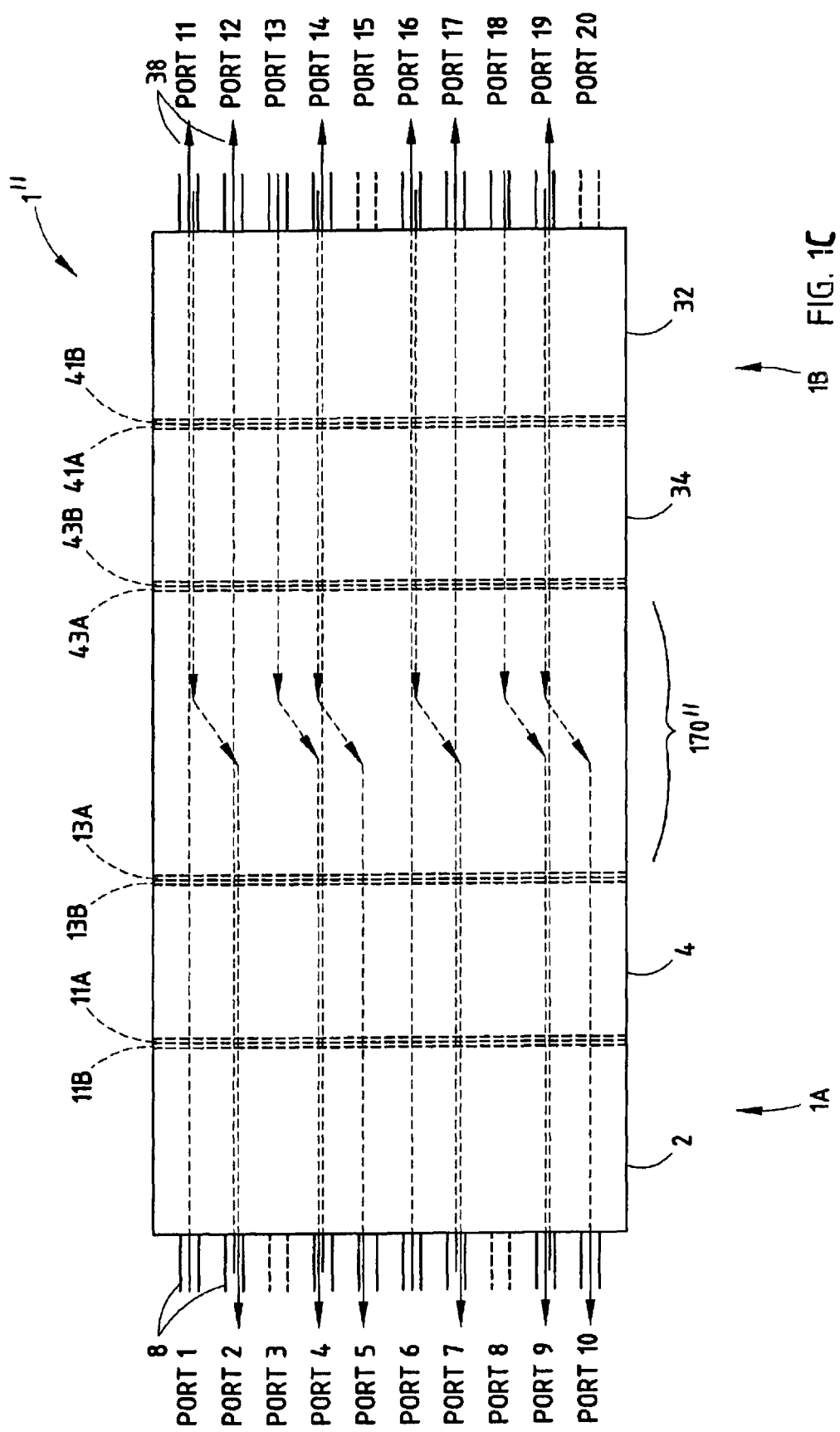
FIG. 1C is a top view of the arrayed optical device of FIG. 1A, when implemented as an arrayed optical circulator.

FIG. 1C illustrates a top view of an arrayed optical circulator 1", according to another embodiment of the present invention. As shown in FIG. 1C, the arrayed optical circulator 1" has four four-port circulators arranged as follows: circulator A ports 1, 11, 2 and 12), circulator B (ports 13, 4, 14 and 5), circulator C (ports 6, 16, 7 and 17) and circulator D (ports 18, 9, 19 and 10). As shown in FIG. 1C, the fiber array blocks 2 and 32 each retain ten optical fibers and ports 3, 15, 8 and 20 are terminated to reduce crosstalk between the individual circulators (circulators A, B, C and D). Crosstalk can be reduced further by terminating additional ports between the circulators, e.g., ports 3 and 13 can both be terminated, with the second circulator then including ports 4, 14, 5 and 15. It should be appreciated that the number of ports in the individual circulators can be adjusted through the proper selection of termination ports. For example, five three-port circulators can be fabricated from the configuration shown in FIG. 1C by terminating ports 12, 14, 16, 18 and 20.

Figure 2A:
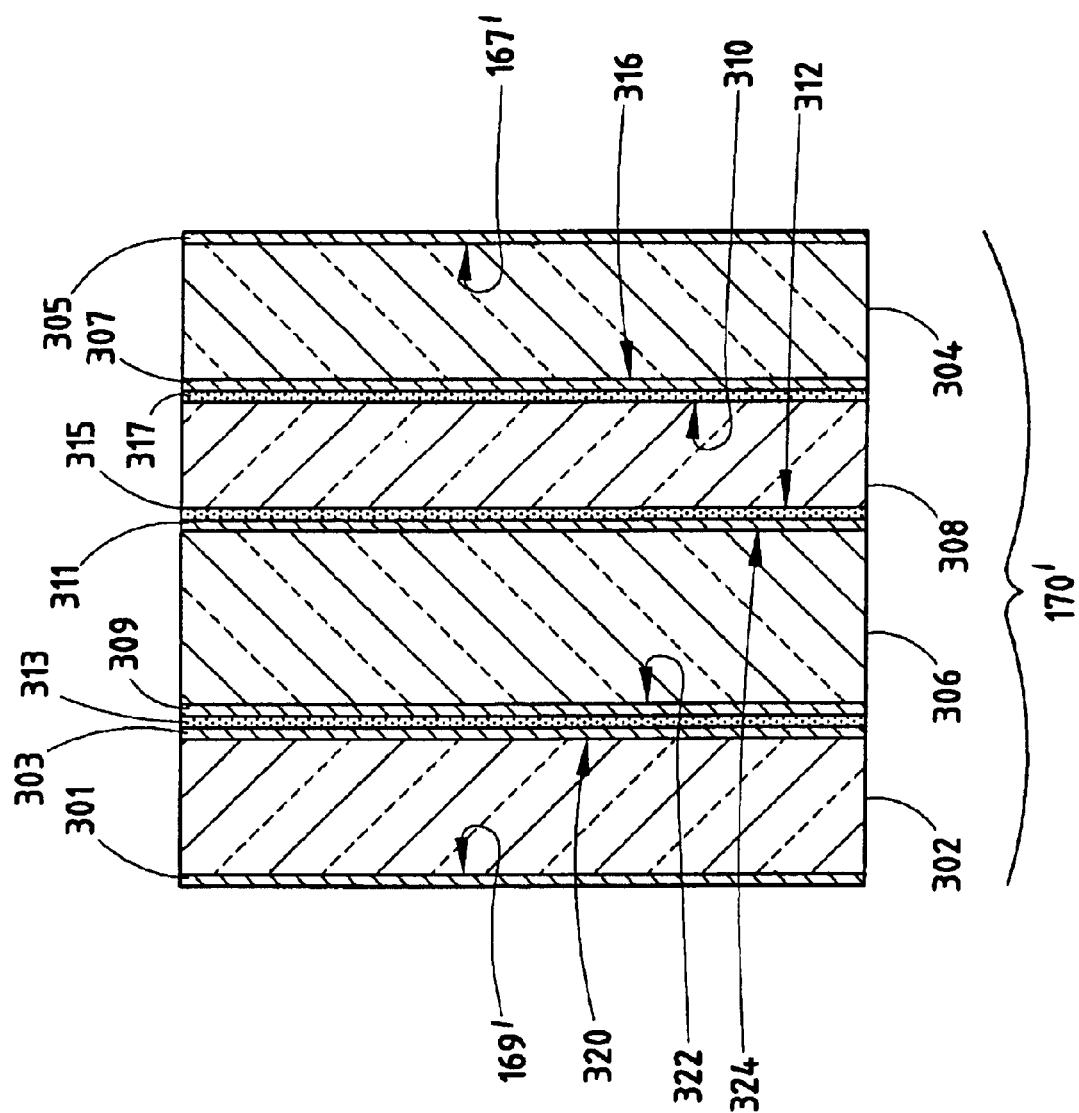
FIG. 2A is a cross-sectional view of a preferred optical isolator chip, according to another embodiment of the present invention.

A preferred optical isolator chip 170', according to an embodiment of the present invention, is shown in FIG. 2A. The isolator chip 170' includes a first rutile (more generally, a birefringent crystal plate) 302, a garnet 306 (e.g., a latching garnet), a half-wave plate 308 and a second rutile 304. If desired, the rutiles 302 and 304 can be replaced by $YVO_4$ crystal plates or other birefringent crystal plates. Further, the half-wave plate 308 can be, for example, a $SiO_2$ crystal or a polyimide half-wave plate.

It should be appreciated that when the garnet 306 is a latching garnet, magnetic sealing of the arrayed optical isolator is desirable. It should also be appreciated that when the garnet is a non-latching garnet, an outer magnet (not separately shown) is required. The first rutile 302 includes a first surface, which acts as a first chip surface 169' and a second surface 320. The first chip surface 169' preferably includes an AR coating 301. The first rutile 302 also, preferably, includes an AR coating 303 on the second surface 320. When used with a chip spacer 160 (see FIG. 7A), the AR coating 301 preferably matches the refractive index of the spacer 160. The AR coating 303 preferably matches the refractive index of optical adhesive 313.

The garnet 306 preferably includes an AR coating 309 on a first surface 322 and an AR coating 311 on a second surface 324, for index matching with index-matched optical adhesives 313 and 315, respectively. The garnet 306 is coupled to the first rutile 302 with the optical adhesive 313. The half-wave plate 308, which is preferably an $SiO_2$ crystal half-wave plate, includes a first surface 312 and a second surface 310. The first surface 312 is coupled to the second surface 324 of the garnet 306 with the adhesive 315. The refractive index of the optical adhesive 315 also preferably matches that of the half-wave plate 308. The second rutile 304 includes an AR coating 307 on a first surface 316 and an AR coating 305 on a second chip surface 167' for index matching with an indexed-matched optical adhesive 317 and the adhesive used to couple the chip 170' to an optical fiber collimator array, respectively. The second rutile 304 is coupled to the second surface 310 of the half-wave plate 308 with the adhesive 317.

In operation, an optical beam incident upon the first chip surface 169' passes through the first rutile 302, which acts to split the incident beam into an ordinary ray and extraordinary ray. The ordinary and extraordinary rays pass through the garnet 306, which non-reciprocally rotates the rays, preferably, by an angle of forty-five degrees. The rotated ordinary and extraordinary rays then encounter the half-wave plate 308, which reciprocally rotates the ordinary and the extraordinary rays, preferably, by an angle of about forty-five degrees. After passing through the half-wave plate 308, the ordinary and the extraordinary rays (each rotated by ninety degrees) pass through the second rutile 304, which causes the ordinary and extraordinary rays to converge into a single beam. It will be appreciated by one of ordinary skill in the art that a reflected ray traveling in the opposite direction of an incoming ray will diverge at the first chip surface 169' such that, for example, the reflected ray will strike facets of the optical fibers 108 (see FIG. 7A) and, as a result, will not be coupled back into the optical fibers 108.

The first and second rutiles 302 and 304 preferably have the same orientation and have a width to provide a preferred separation of the ordinary and extraordinary rays. A primary advantage of utilizing an optical isolator chip 170', constructed according to FIG. 2A, is that the isolator chip 170' naturally exhibits low polarization mode dispersion (PMD), since the path length for the ordinary and extraordinary rays are equal. Another advantage of the chip 170' is that it naturally exhibits low polarization dependent loss (PDL), since the two separated beams, i.e., the ordinary ray and the extraordinary ray, converge into a single beam, before being introduced into, for example, the second optical fiber collimator array 101B (see FIG. 7A). While the isolator chip 170', described above, implements birefringent crystal plates (i.e., rutiles), it should be understood that an isolator chip, according to the present invention, may also use birefringent wedges by excluding the half-wave plate 308.

Figure 2B:
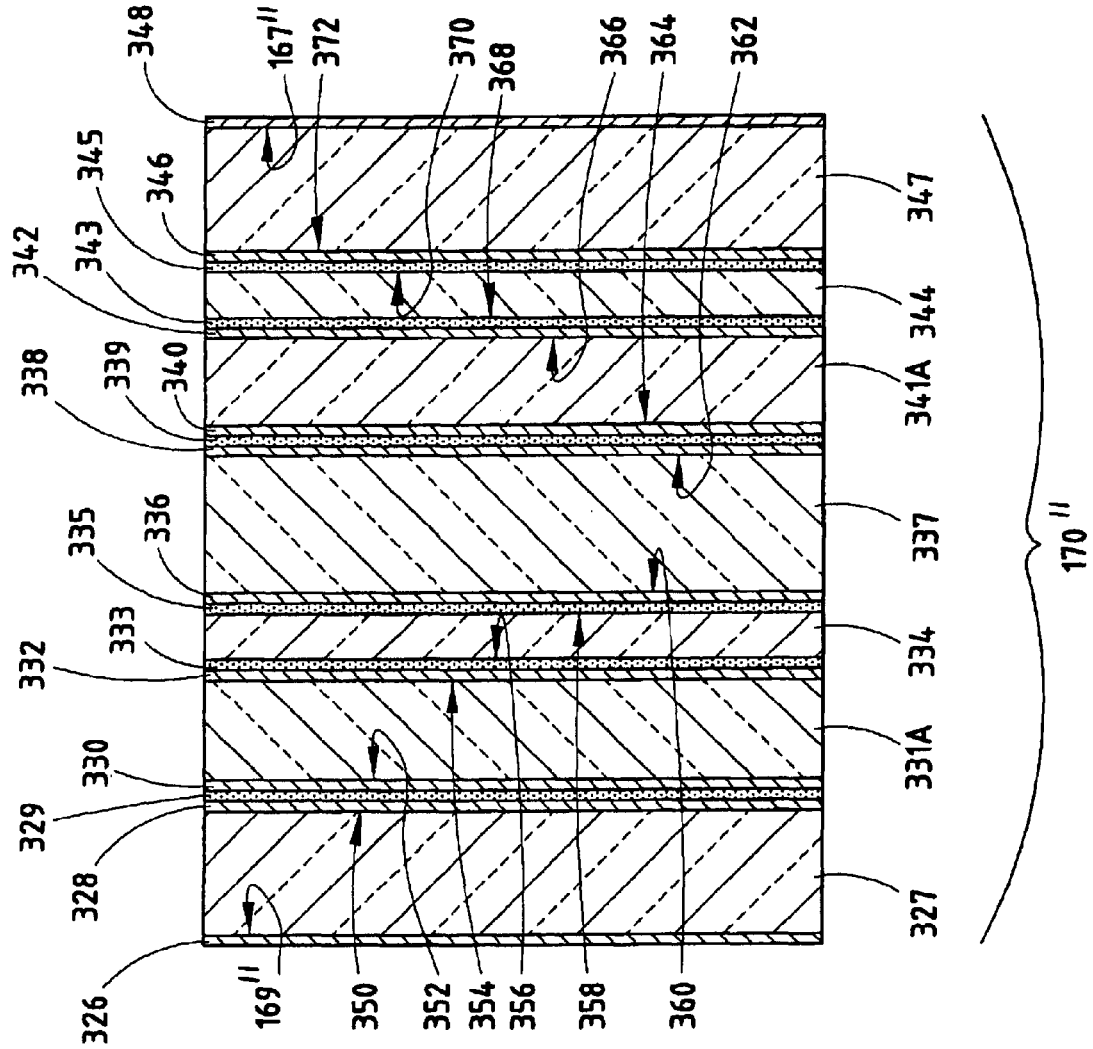
FIGS. 2B–2C are a top and cross-sectional view, respectively, of a preferred optical circulator chip, according to yet another embodiment of the present invention.
Figure 2C:
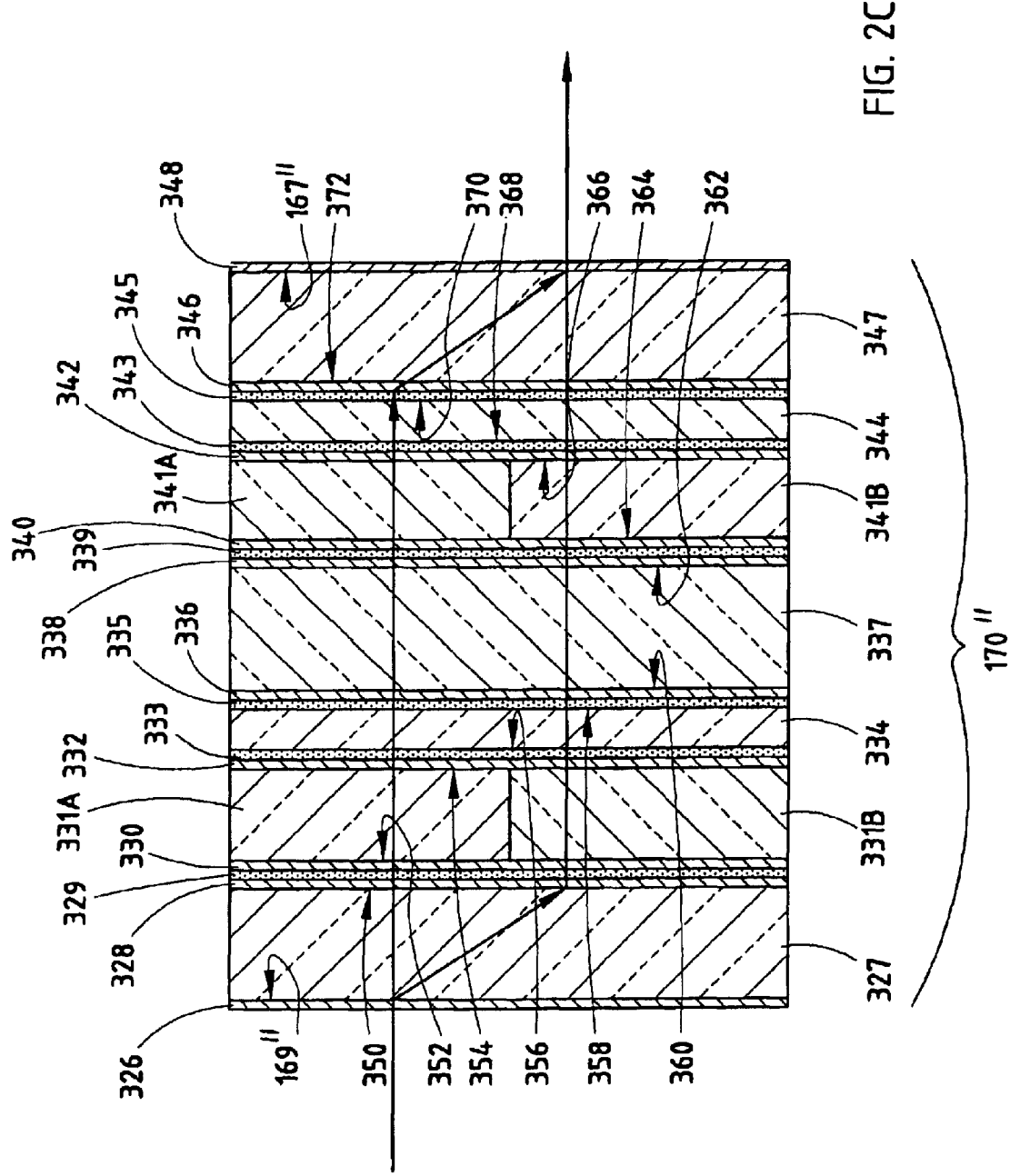

A preferred optical circulator chip 170" is shown in FIGS. 2B–2C. The circulator chip 170" includes a first rutile (more generally, a birefringent crystal plate) 327, a first pair of garnets 331A and 331B (e.g., latching garnets), a first half-wave plate 334, a second rutile 337, a second pair of garnets 341A and 341B, a second half-wave plate 344 and a third rutile 347. The garnets 331A and 341B make a polarized ray rotate in one direction (e.g. clockwise) and the garnets 331B and 341A make the polarized ray rotate in the opposite direction (counter-clockwise). The rutiles 327, 337 and 347 can be replaced by $YVO_4$ crystal plates or other birefringent crystal plates. Further, the half-wave plates 334 and 344 can be, for example, a $SiO_2$ crystal or a polyimide half-wave plate.

It should be appreciated that when the garnets 331A, 331B, 341A and 341B are latching garnets, magnetic sealing of the arrayed optical circulator is desirable. It should also be appreciated that when the garnets are non-latching garnets, an outer magnet (not separately shown) is required. The first rutile 327 includes a first surface, which acts as a first chip surface 169" and a second surface 350. The first surface preferably includes an AR coating 326. The first rutile 327 also, preferably, includes an AR coating 328 on the second surface 350. When a chip spacer 160 is used (see FIG. 7A), the AR coating 326 preferably matches the spacer 160 in refractive index. The AR coating 328 is preferably selected to match the refractive index of optical adhesive 329.

The garnets 331A and 331B preferably include an AR coating 330 on a first surface 352 and an AR coating 332 on a second surface 354. The garnets 331A and 331B are coupled to the first rutile 327 with the adhesive 329. The half-wave plate 334, which is preferably an $SiO_2$ crystal half-wave plate, includes a first surface 356 and a second surface 358. The first surface 356 is coupled to the second surface 354 of the garnets 331A and 331B, preferably, with an index-matched optical adhesive 333. The refractive index of the adhesive 333 preferably matches that of the half-wave plate 334. The second rutile 337 preferably includes an AR coating 336 on a first surface 360 for index matching with an index-matched optical adhesive 335 and an AR coating 338 on a second surface 362 for index matching with an index-matched optical adhesive 339. The second rutile 337 is coupled to the second surface 358 of the half-wave plate 334 with the adhesive 335. The garnets 341A and 341B preferably include an AR coating 340 on a first surface 364 and an AR coating 342 on a second surface 366. The first surface 364 is coupled to the second surface 362 of the second rutile 337 with the adhesive 339. The second surface 366 is coupled to a first surface 368 of the second half-wave plate 344, preferably, with an index-matched optical adhesive 343. A second surface 370 of the half-wave plate 344 is coupled to a first surface 372 of the third rutile 347. The third rutile 347 preferably includes an AR coating 346 on the first surface 372 for index matching with the index-matched optical adhesive 345 and an AR coating 348 on a second chip surface 167". The third rutile 347 is coupled to the second surface 370 of the half-wave plate 344 with the adhesive 345.

In operation, an optical beam incident upon the first chip surface 169" (e.g., at port 1, see FIG. 1C) passes through the first rutile 327, which acts to split the incident beam into an ordinary ray and extraordinary ray. The ordinary and extraordinary rays pass through the first latching garnets 331A and 331B, which non-reciprocally rotate the rays, preferably, by an angle of forty-five degrees clockwise and counter-clockwise, respectively. The rotated ordinary and extraordinary rays then encounter the first half-wave plate 334, which reciprocally rotates the ordinary and the extraordinary rays, preferably, by an angle of about forty-five degrees. After passing through the half-wave plate 334, the rays become ordinary rays only and pass through the second rutile 337. Then, the ordinary rays pass through the second latching garnets 341A and 341B, which non-reciprocally rotate the rays again, preferably, by an angle of forty-five degrees clockwise and counter-clockwise, respectively. The rays, which have been rotated in different directions then encounter the second half-wave plate 344, which recipro-cally rotates the rays, preferably, by an angle of about forty-five degrees. After passing through the half-wave plate 344, the rays (each rotated by about ninety degrees) pass through the third rutile 347, which causes the ordinary and extraordinary rays to converge into a single beam (e.g., at port 11). It will be appreciated by one of ordinary skill in the art that a ray traveling in the opposite direction of an incoming ray at port 11 will change optical paths in the second rutile 337 of the circulator chip 170" and be coupled into port 2 (see FIG. 1C).

In FIG. 2C, the first pair of garnets 331A and 331B and the second pair of garnets 341A and 341B have opposite directions of Faraday rotation. These first and second pair of garnets could be replaced by single first/second garnets by replacing the single first/second half-wave plates by a first/second pair of half-wave plates whose optical axes are orthogonal with each other.

The first and third rutiles 327 and 347 preferably have the same orientation and have a preferred width of about five to seven millimeters, which provides about a five to seven-hundred micron separation of the ordinary and extraordinary rays. The second rutile 337 preferably has an orthogonal orientation to the first and third rutiles 327 and 347 and has a preferred width of two and one-half millimeters, which provides about a 250 micron shift of the optical path.

Figure 3:
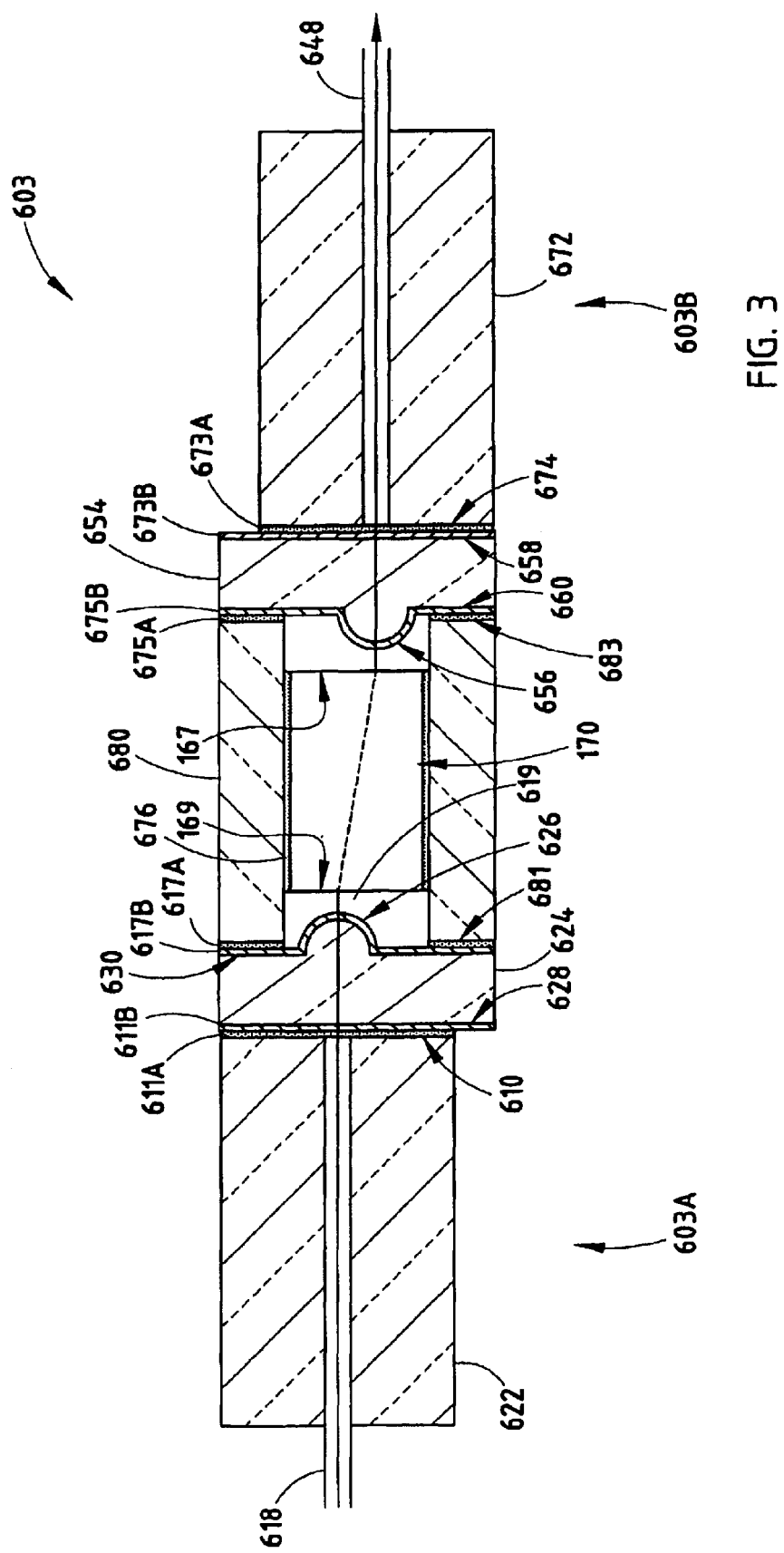
FIG. 3 is a cross-sectional view of an arrayed optical device, according to another embodiment of the present invention.

FIG. 3 illustrates a cross-sectional view of an arrayed optical device 603, according to another embodiment of the present invention. The optical chip 170 (see FIGS. 2A–2C) is retained, e.g., with an adhesive 676, within a spacer 680 that is coupled between a pair of optical fiber collimator arrays 603A and 603B (with adhesives 617A and 675A, for example) to form the arrayed optical device 603 after active optical alignment between the fiber collimator array 603A and the spacer 680 (including the optical chip 170) and the fiber collimator array 603B. The structure of the arrays 603A and 603B are similar to that of the arrays 1A and 1B in FIG. 1A, except for the type of microlens. As shown in FIG. 3, the microlens array substrates 624 and 654 are refractive microlens array substrates that each include a plurality of refractive microlenses 626 and 656. The configuration between the arrays 603A and 603B, the spacer 680 and the chip 170 are similar to that of the optical device 600 of FIG. 4 and, as such, are not further discussed herein.

Figure 4:
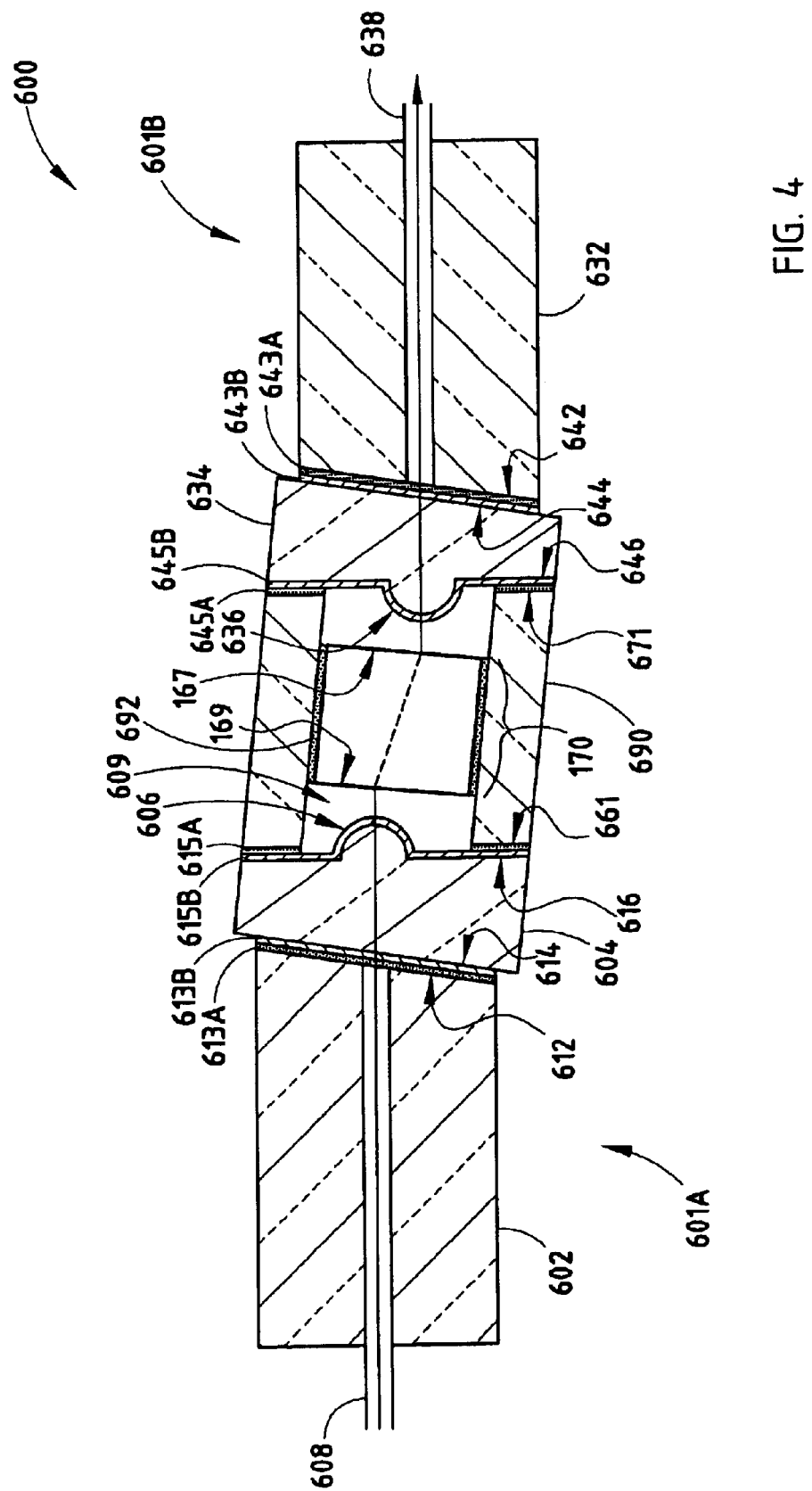
FIG. 4 is a cross-sectional view of yet another embodiment of an arrayed optical device of the present invention.

FIG. 4 illustrates a cross-sectional view of an arrayed optical device 600, according to a different embodiment of the present invention. The optical chip 170 (see FIGS. 2A–2C) is retained, e.g., with an adhesive 692, within a spacer 690 that is coupled between a pair of optical fiber collimator arrays 601A and 601B; after active optical alignment between the fiber collimator array 601A and the spacer 690 (including the optical chip 170) and the fiber collimator array 601B.

The optical fiber collimator array 601A is coupled at a microlens surface 616, of a microlens array substrate 604, to a first surface 661 of the spacer 690 with an adhesive 615A. An optical fiber array block 602 retains a plurality of optical fibers 608 and includes an angled surface 612 that is coupled (e.g., with an index-matched optical adhesive 613A) to a sloped surface 614 of the substrate 604. If desired, an AR coating 613B may also be provided on the surface 614. During construction, the substrate 604 is adjusted in relation to the block 602 such that the optical beams coincide with the optical axis of the microlenses 606, integrated along the microlens surface 616. The coefficient of thermal expansion (CTE) of the spacer 690 is preferably similar to that of the substrates 604 and 634. When proper alignment is achieved between the substrate 604 and the block 602, they are coupled together, for example, with an index-matched optical adhesive 613A. If desired, an AR coating 615B may also be provided on the surface of microlens 606.

The optical fiber collimator array 601B, whose construction is similar to that of the optical fiber collimator array 601A, is coupled at a microlens surface 646 of a microlens array substrate 634, with an adhesive 645A to a second surface 671 of the spacer 690. If desired, an AR coating 645B may also be provided on the surface of the microlenses 636. In the array 601B, an optical fiber array block 632 retains a plurality of optical fibers 638 and includes an angled surface 642 that is coupled to a sloped surface 644 of the substrate 634. When proper alignment is achieved between the block 632 and the substrate 634, they are coupled together, for example, with an index-matched optical adhesive 643A. If desired, an AR coating 643B may also be provided on the surface 644.

The optical fiber array blocks 602 and 632, of FIG. 4, each include a plurality of channels for receiving the fibers 608 and 638, respectively, which are, for example, retained within the blocks 602 and 632 with an adhesive. The microlens array substrates 604 and 634 each include a plurality of refractive or diffractive microlenses 606 and 636. The microlenses 606 and 636 are spaced such that each microlens 606/636 receives/provides an optical signal from/to one of the optical fibers 608/638, when the device 600 is configured as an arrayed optical isolator. A suitable angle for the angled surfaces 612 and 642 is about 8+/−0.1 degrees. It should be appreciated that the angle range (e.g., 4.0 to 12.0 degrees) is a function of the desired minimum reflection. For example, if a center angle of 8.5 degrees is utilized, a wider angular range of about +/−0.6 degrees provides an acceptable reflection reduction (i.e., about 60 dB). A suitable angle for the slanted surfaces 614 and 644 is about +/−0.5 degrees from the center angle. It should also be appreciated that the adhesives 615A and 645A are not required to be index-matched optical adhesives as an optical beam traveling from any of the microlenses 606 travels through air (i.e. a hole 609 in the spacer 690) before reaching the optical chip 170. Further, an optical beam leaving the optical chip 170 only travels through air before encountering one of the microlenses 636.

Figure 5:
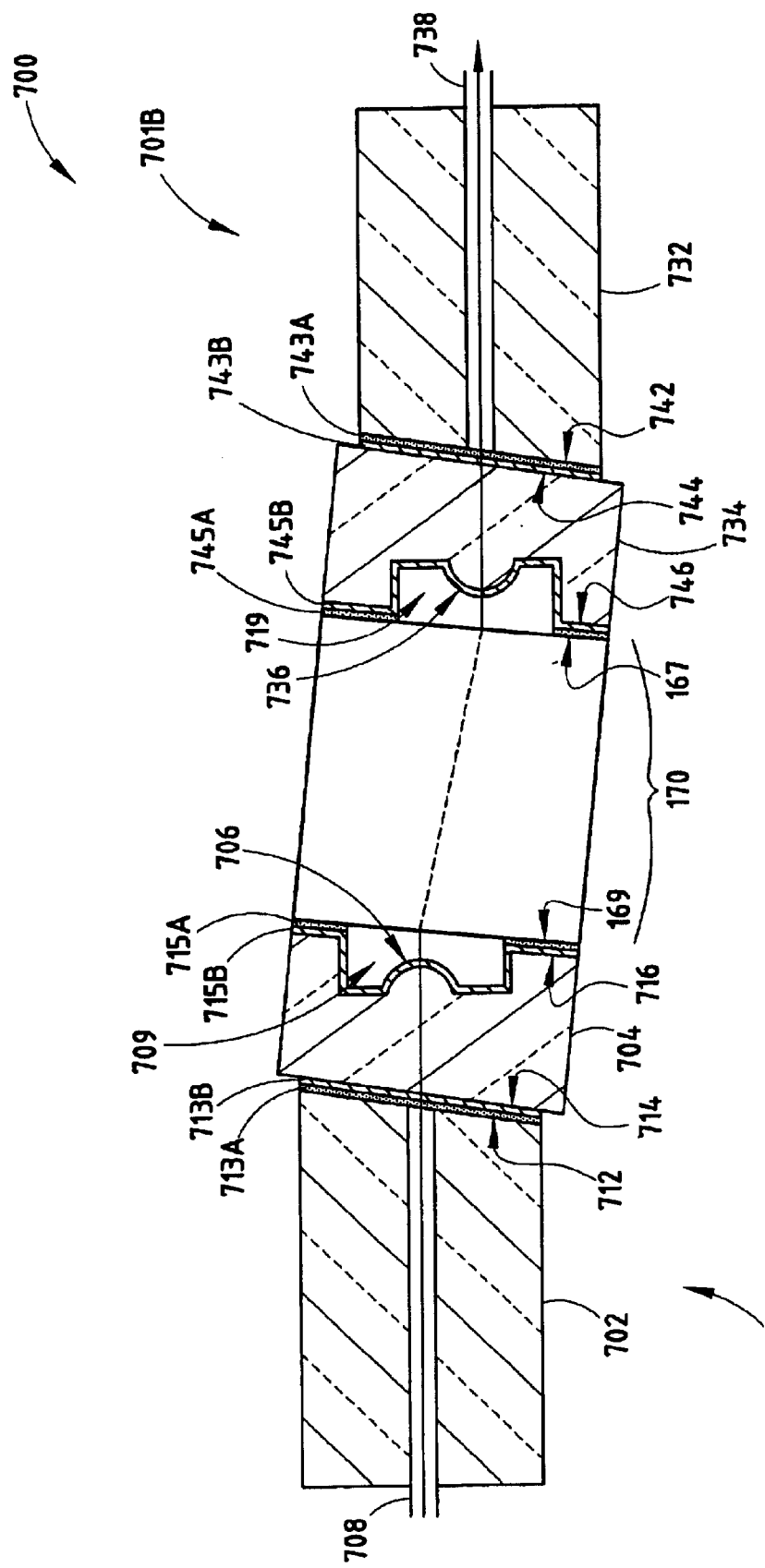
FIG. 5 is a cross-sectional view of still another embodiment of an arrayed optical device of the present invention.

FIG. 5 illustrates a cross-sectional view of an arrayed optical device 700, according to yet a different embodiment of the present invention. The optical chip 170 (see FIGS. 2A–2C) is retained, e.g., with an adhesive, between a pair of optical fiber collimator arrays 701A and 701B; after active optical alignment between the fiber collimator array 701A and the optical chip 170 and the fiber collimator array 701B.

The optical fiber collimator array 701A is coupled, at a microlens surface 716 of microlens array substrate 704, to the first chip surface 169 of the optical chip 170 with an adhesive 715A. If desired, an AR coating 715B may also be provided on the surface of the microlenses 706. An optical fiber array block 702 retains a plurality of optical fibers 708 and includes an angled surface 712 that is coupled to a sloped surface 714 of the microlens array substrate 704. If desired, an AR coating 713B may also be provided at the interface between the block 702 and the substrate 704. During construction, the substrate 704 is adjusted in relation to the block 702 such that the optical beams coincide with the optical axis of the microlenses 706, which are integrated along the microlens surface 716. When proper alignment is achieved between the substrate 704 and the block 702, they are coupled together, preferably, with an index-matched optical adhesive 713A.

The optical fiber collimator array 701B, whose construction is similar to that of the optical fiber collimator array 701A, is coupled, at a microlens surface 746 of a microlens array substrate 734, with an adhesive 745A to the second chip surface 167 of the optical chip 170. If desired, an AR coating 745B may also be provided on the surface of the microlenses 736. In the array 701B, an optical fiber array block 732 retains a plurality of optical fibers 738 and includes an angled surface 742 that is coupled to a sloped surface 744 of the substrate 734. When proper alignment is achieved between the block 732 and the substrate 734, they are coupled together, preferably, with an index-matched optical adhesive 743A. If desired, an AR coating 743B may also be provided on the surface 744. Another AR coating on the surface 742 is also acceptable, instead of the coating 743B.

The optical fiber array blocks 702 and 732, of FIG. 5, each include a plurality of channels for receiving the fibers 708 and 738, respectively, which are preferably retained within the blocks 702 and 732 with an adhesive, for example. The microlens array substrates 704 and 734 each include a plurality of refractive or diffractive microlenses 706 and 736. The microlenses 706 and 736 are spaced such that each microlens 706/736 receives/provides an optical signal from/to one of the optical fibers 708/738, when the device 700 is configured as an arrayed optical isolator. A suitable angle for the angled surfaces 712 and 742 is about 8+/−0.1 degrees. A suitable angle for the slanted surfaces 714 and 744 is adjusted such that the optical beams are perpendicular to the optical axis of microlenses 706 and 736 in the substrate 704 and 734, respectively, and a tolerance of the angle is +/−0.5 degrees from the center angle. As above, it should be appreciated that the angle range is a function of the desired minimum reflection. For example, if a center angle of 8.5 degrees is utilized, a wider angular range of about +/−0.6 degrees provides an acceptable reflection reduction. It should also be appreciated that the adhesives 715A and 745A are not required to be index-matched optical adhesives as an optical beam traveling from any of the microlenses 706 travels through an air gap 709, which is achieved during the formation of surface 716, before reaching the optical chip 170. Further, an optical beam leaving the optical chip 170 only travels through an air gap 719, which is achieved during the formation of the surface 746, before reaching one of the microlenses 736.

Figure 6:
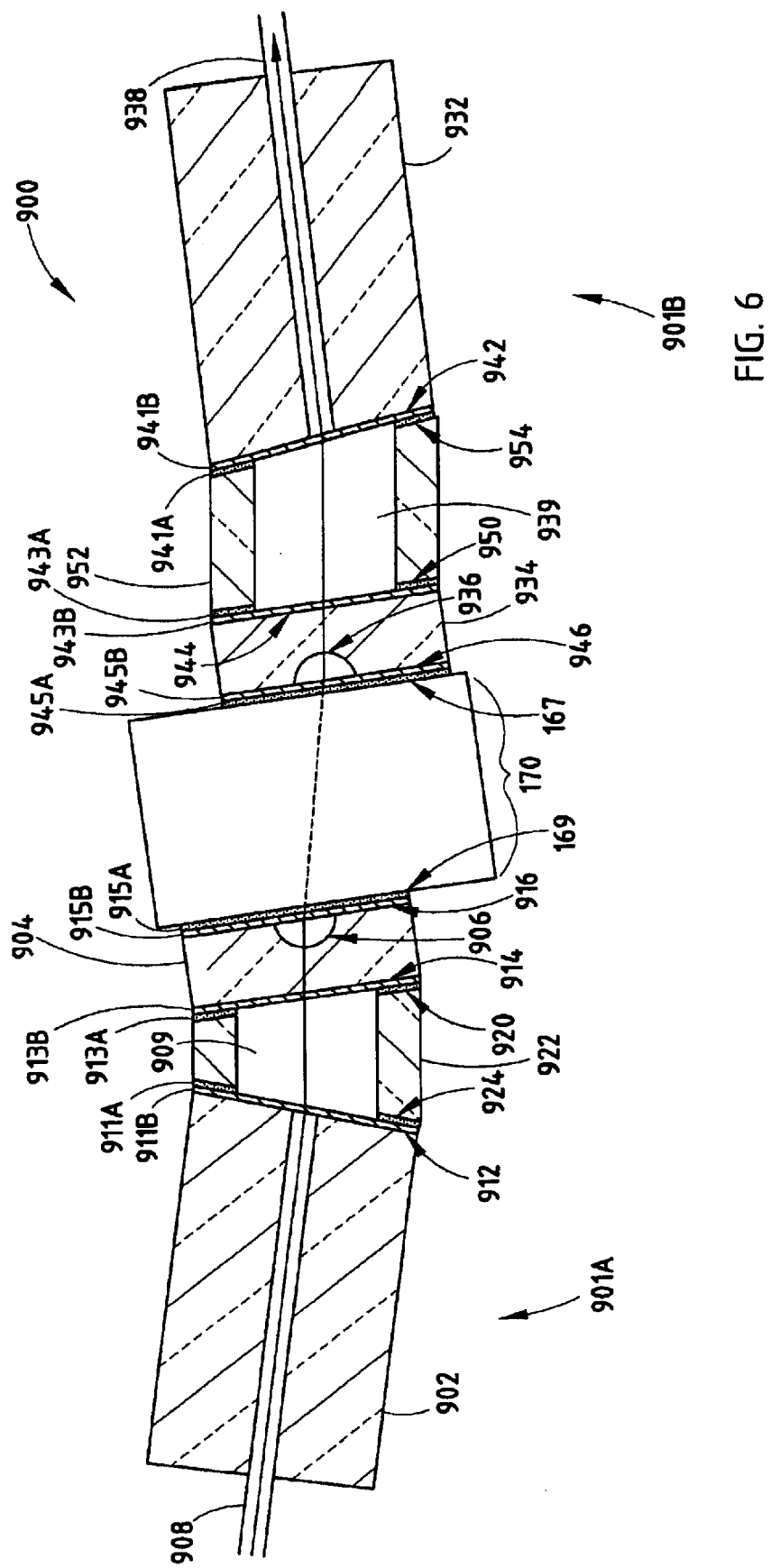
FIG. 6 is a cross-sectional view of an arrayed optical device, according to another embodiment of the present invention.

FIG. 6 illustrates a cross-section of an arrayed optical device 900, according to another embodiment of the present invention. The optical chip 170 (see FIGS. 2A–2C) is coupled (with an index-matched optical adhesive 915A and 945A, for example) between a pair of optical fiber collimator arrays 901A and 901B to form an arrayed optical device 900 after active optical alignment between the fiber collimator array 901A and the optical chip 170 and the fiber collimator array 901B.

In the arrays 901A and 901B, optical fiber array blocks 902 and 932, respectively, retain a plurality of optical fibers 908 and 938. The blocks 902 and 932 each include an angled surface 912 and 942, respectively, that is coupled (e.g., with an adhesive 911A and 941A) to a slanted surface 924 and 954 of a spacer 922 and 952, respectively. If desired, an AR coating 911B and 941B may be provided on the angled surface 912 and 942, respectively. A suitable angle for the angled surfaces 912 and 942 is determined by the requirement for return loss and is set to about 8+/−0.1 degrees to reduce the effect of reflection in the device 900 by about 60 dB.

The spacers 922 and 952 each include a second surface 920 and 950 that is opposite the slanted surface 924 and 954 and a hole 909 and 939, respectively. The relative angle between the surface 920/950 and the surface 924/954 of the spacer 922/952 is designed such that the optical beams, passing through the hole 909/939 (i.e. air), are shifted about 0.1 to 5.0 degrees from perpendicular to the surface 920/950.

The microlens array substrates 904 and 934 each include a plurality of GRIN microlenses, which are spaced such that each microlens 906/936 receives/provides an optical signal from/to one of the optical fiber 908/938, when the device 900 is configured as an arrayed optical isolator. A substrate surface 914 and 944 of the microlens array substrate 904 and 934 is then adjusted in relation to the surface 920 and 950 such that the coupling efficiency of the optical power becomes maximum for the arrays 901A and 901B and the optical beam is shifted about 1 to 5 degrees from the optical axis of each of the microlenses 906 and 936. If desired, AR coatings 913B and 943B may be provided on the substrate surfaces 914 and 944, respectively. As such, the reflection at the surfaces 914 and 944 is reduced by about 60 dB.

When proper alignment is achieved between the spacers 922 and 952 and the substrate 904 and 934, respectively, they are coupled together, for example, with adhesives 913A and 943A, respectively. An index-matched optical adhesive is not required for the adhesives 913A and 943A as the optical beams travel through air and not through the adhesive 913A and 943A when passing from the optical fibers 908 to the microlenses 906 and from the microlenses 936 to the optical fibers 938. If desired, AR coatings 915B and 945B may be provided on the microlens surfaces 916 and 946, respectively.

The microlens surfaces 916 and 946 of the substrates 904 and 934 are coupled with an index-matched optical adhesive 915A and 945A, respectively, to the first and second chip surfaces 169 and 167 of the optical chip 170. The angle of both surfaces 169 and 167 of the optical chip 170 are shifted from perpendicular to the optical beam axis similar to the microlens surfaces 916 and 946 with an angle from about 0.1 to 5.0 degrees. As such, the reflection effect on the device 900 at the surfaces 169 and 167 is reduced by about 60 dB. Similar reflection reductions are also expected for all the surfaces in the optical chip 170 since they are all perpendicular with each other (see FIGS. 2A–2C).

Figure 7A:
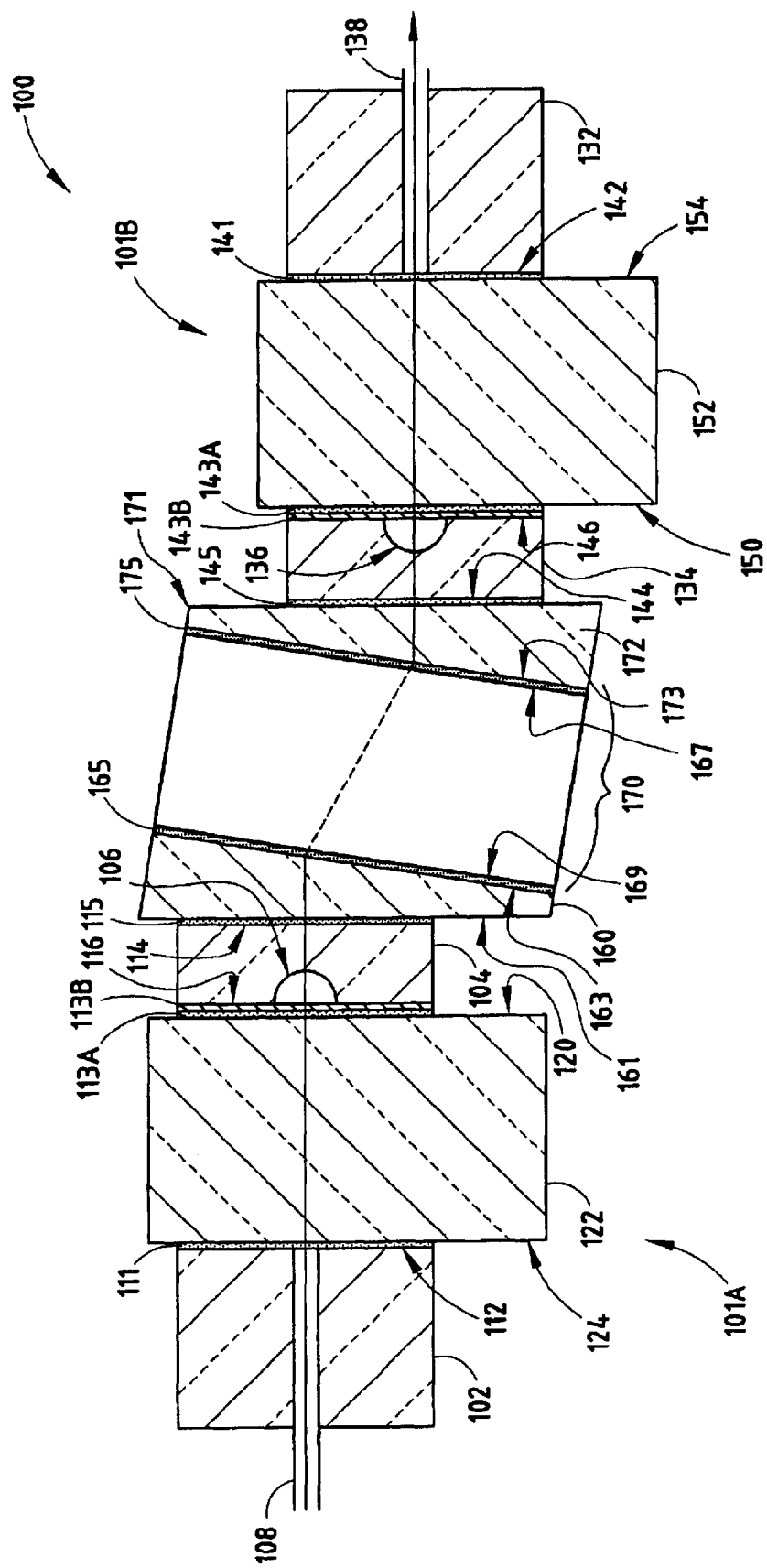
FIG. 7A is a cross-sectional view of an arrayed optical device, according to another embodiment of the present invention.

FIG. 7A illustrates a cross-sectional view of two optical fiber collimator arrays 101A and 101B that in combination with an optical chip 170 (see FIGS. 2A–2C) and two index-matched angled spacers 160 and 172 form an arrayed optical device 100 (e.g., an arrayed optical isolator 100', FIG. 7B, or an arrayed optical circulator 100", FIG. 7C), according to another embodiment of the present invention. As further depicted in FIG. 7B, the arrayed optical isolator 100' has four channels. One of ordinary skill in the art will appreciate that a larger or smaller number of channels can readily be implemented, according to the present invention. As shown in FIG. 7A, the optical chip 170, with index-matched angled spacers 160 and 172 (preferably, matched to the refractive index of a respective microlens array substrate 104 and 134), is coupled between the pair of optical fiber collimator arrays 101A and 101B with index-matched optical adhesive (organic or inorganic); after active optical alignment between the fiber collimator array 101A and the optical chip 170 (including the spacers 160 and 172) and the fiber collimator array 101B.

In the embodiment of FIG. 7A, all surfaces of the arrays 101A and 101B, that an optical beam crosses, are substantially perpendicular to the optical axes of each microlens 106 and 136, respectively. In array 101A, an optical fiber array block 102 retains a plurality of optical fibers 108 and includes a first surface 112 that is coupled (e.g., with an index-matched optical adhesive 111) to a first surface 124 of an index-matched spacer 122.

The refractive index of the spacer 122 is preferably matched to the refractive index of the core of the optical fibers 108. This technique, which is generally known as the 'index matching method', normally reduces optical power reflection at material boundaries. Typically, a portion of the optical power input from a given optical fiber 108 is reflected at the surfaces 112 and 124. This reflected power, when induced back into one of the optical fibers 108, causes degradation of the transmission system. Usually an AR coating is used to reduce reflections at material boundaries. However, reflected power reduction by AR coating is generally limited to about 30 dB. The index matching method is generally more effective than AR coating and, when implemented as described herein, the reflection reduction is typically about 45 dB, when the temperature dependence of the refractive index of the materials is taken into consideration (i.e., when the materials are CTE matched).

The spacer 122 includes a second surface 120 that is opposite the first surface 124. A microlens surface 116 of the microlens array substrate 104 is then adjusted in relation to the second surface 120 such that the optical beams from the optical fibers 108 coincide with the optical axes of each of the microlenses 106. When proper alignment is achieved between the substrate 104 and the block 102, through the spacer 122, the substrate 104 and the spacer 122 are coupled together, preferably, with an index-matched optical adhesive 113A. In this configuration, the reflection from the microlens surface 116, of the microlens array substrate 104, can be reduced by adding an AR coating 113B to the microlens surface 116 for index matching to the spacer 122, if the difference in refractive index between the spacer 122 and the microlenses 106 is significant.

In this configuration, the majority of the reflected optical power is not induced back into the optical fibers 108 due to the spacing, dictated by the width (dependent on the focal length of the microlenses 106) of the spacer 122, between the ends of the optical fibers 108 and the microlenses 106. This is because the modefield of an optical beam from each of the fibers 108 diverge until they reach one of the microlenses 106 and that of a reflected beam at surfaces 120 and 116 also diverge until they reach one of the fibers 108. Approximately a 20 dB reduction is achievable due to the spacing for the optical power introduced from standard single-mode fibers if the optical spacer width is about 0.7 microns, for example. As a result, in this case, the optical power introduced back into one of the fibers 108 is expected to be reduced by over 45 dB, as compared to a 30 dB reflection reduction at maximum for an AR coating alone. A back surface 114 of the substrate 104 is coupled to a perpendicular surface 161 of the index-matched angled spacer 160 with an index-matched optical adhesive 115. The refractive index of the spacer 160 is preferably matched to that of the substrate 104. Optical power reflections at the back surface 114 and the surface 116 are typically reduced by up to about 45 dB by the index matching method. Before alignment with the optical fiber collimator array 101A, a slanted surface 163 of the spacer 160 is coupled, with an index-matched optical adhesive 165, to a first chip surface 169 of the isolator chip 170.

The optical fiber collimator array 101B, whose construction is similar to that of the optical fiber collimator array 101A, is coupled at a back surface 144 of a microlens array substrate 134 to a perpendicular surface 171 of the spacer 172 with an index-matched optical adhesive 145. The refractive index of the spacer 172 is preferably matched to that of the substrate 134. Before alignment with the array 101B, a slanted surface 173 of the spacer 172 is coupled with an index-matched optical adhesive 175 to a second chip surface 167 of the optical chip 170. In the array 101B, an optical fiber array block 132 retains a plurality of optical fibers 138 and includes a first surface 142 that is coupled (e.g., with an index-matched optical adhesive 141) to a first surface 154 of an index-matched spacer 152.

The refractive index of the spacer 152 is preferably matched to the refractive index of the core of the optical fibers 138. The spacer 152 includes a second surface 150 that is opposite the first surface 154. During construction of the array 101B, a microlens surface 146 of the microlens array substrate 134 is adjusted in relation to the second surface 150 such that the optical beams from the optical fibers 138 coincide with the optical axes of each of the microlenses 136.

When proper alignment is achieved between the substrate 134 and the block 132, through the spacer 152, they are coupled together, preferably, with an index-matched optical adhesive 143A. In this configuration, the reflection from the microlens surface 136 of the microlens array substrate 134 can be reduced by adding an AR coating 143B to the microlens surface 136 for index matching to the spacer 152, if the difference in index between the spacer 152 and the microlenses 136 is significant.

Figure 7B:
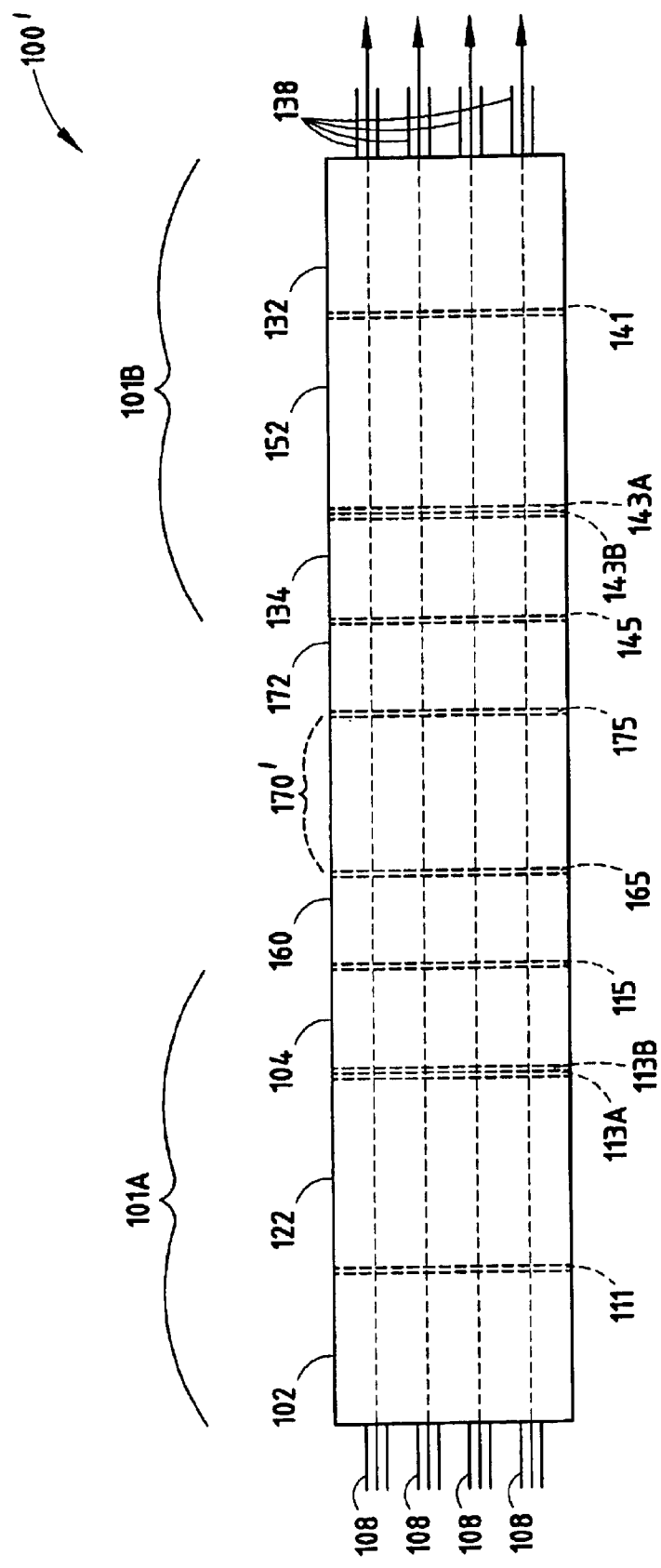
FIG. 7B is a top plan view of the arrayed optical device of FIG. 7A, when implemented as an arrayed optical isolator.
Figure 7C:
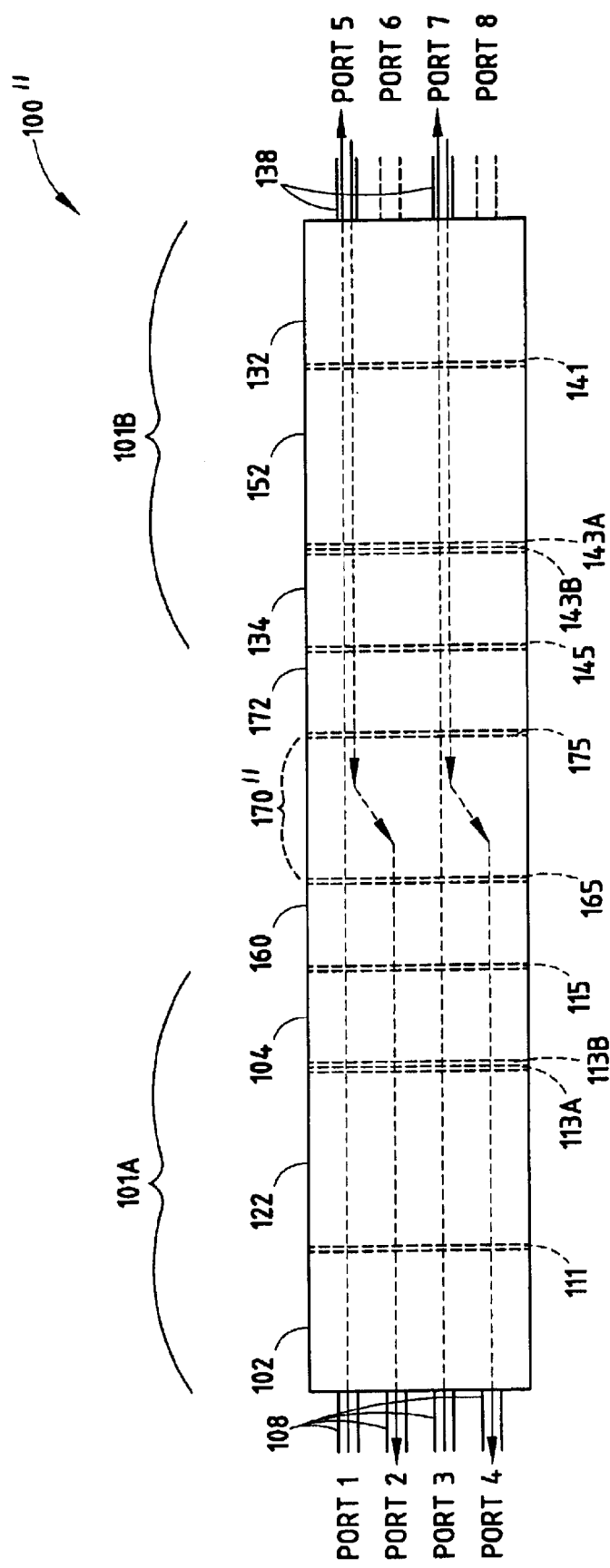
FIG. 7C is a top plan view of the arrayed optical device of FIG. 7A, when implemented as an arrayed optical circulator.

The fiber array blocks 102 and 132 each include a plurality of channels for receiving the fibers 108 and 138, respectively. As shown, the microlens array substrates 104 and 134 are planar graded-index (GRIN) microlens array substrates that each include a plurality of GRIN microlenses 106 and 136. The microlenses 106 and 136 are spaced such that each microlens 106/136 receives/provides an optical signal from/to one of the optical fibers 108/138, when the device 100 is an arrayed optical isolator. A suitable angle for the slanted surfaces 163 and 173 of the spacers 160 and 172 is about 1+/−0.5 degrees, for example, to get about a 60 dB reduction in the reflection effect. It should be appreciated that a range of angles may provide suitable performance (e.g., 0.1 to 10.0 degrees from perpendicular to the optical axes of the optical powers that pass through the isolator chip 170). An arrayed optical isolator 100', which includes four channels, is depicted in FIG. 7B. An arrayed optical circulator 100", which includes two three-port circulators, is shown in FIG. 7C.

Figure 8:
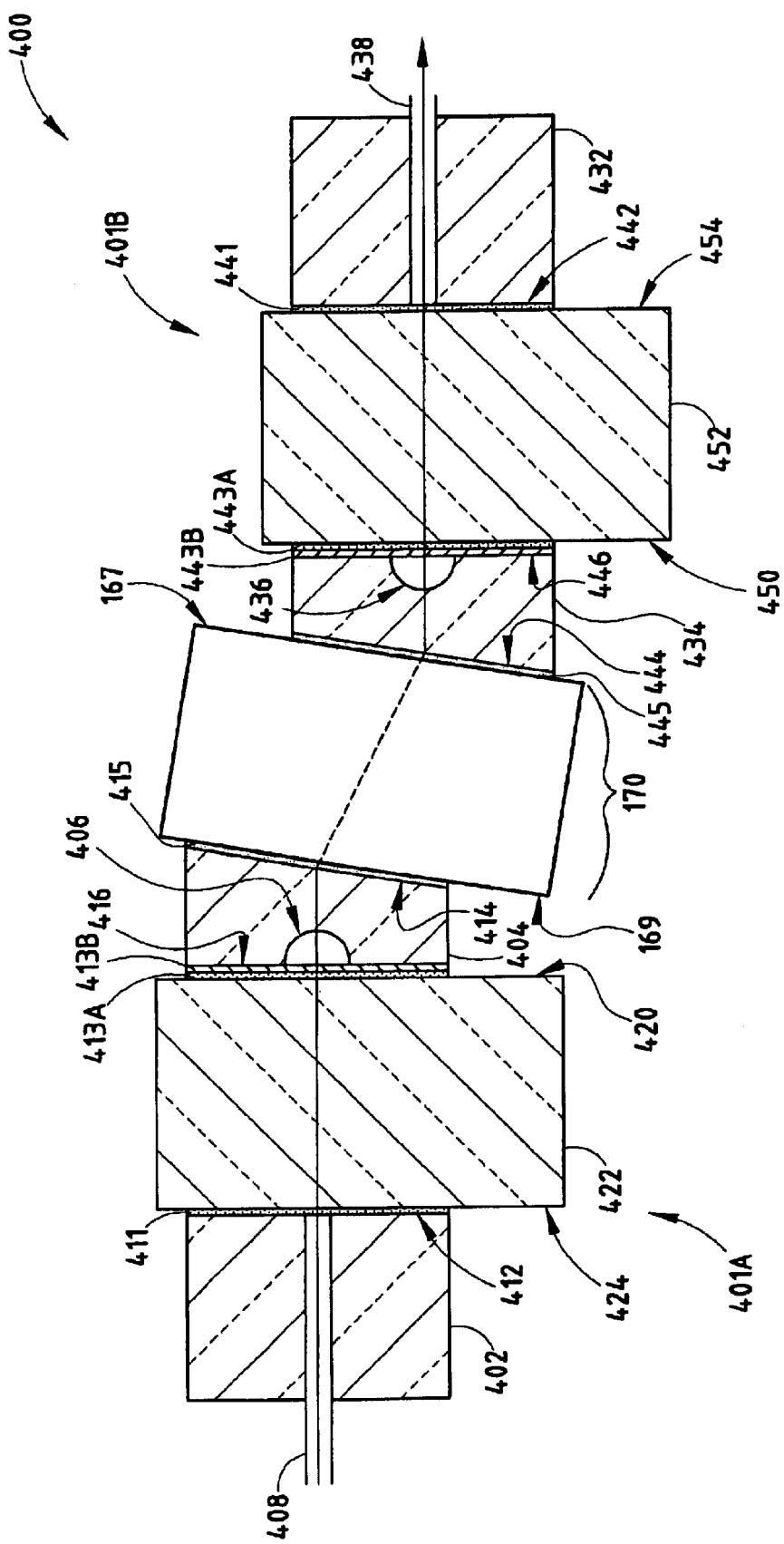
FIG. 8 is a cross-sectional view of an arrayed optical device, according to yet another embodiment of the present invention.

FIG. 8 is a cross-sectional view of two optical fiber collimator arrays 401A and 401B that, in combination with an optical chip 170 (see FIGS. 2A–2C), form an arrayed optical device 400, according to another embodiment of the present invention. The optical chip 170 is coupled between the pair of optical fiber collimator arrays 401A and 401B with an index-matched optical adhesive, for example. The device 400 is similar to the device 100, of FIG. 7A, with the exception that the spacers 160 and 172 are omitted and back surfaces (i.e., substrate surfaces) 414 and 444 of microlens array substrates 404 and 434 are sloped to reduce reflections.

In array 401A, an optical fiber array block 402 retains a plurality of optical fibers 408 and includes a block surface 412 that is coupled (e.g., with an index-matched optical adhesive 411) to a first surface 424 of an index-matched spacer 422. The spacer 422 includes a second surface 420 that is opposite the first surface 424. The refractive index of the spacer 422 is preferably matched to the refractive index of the core of the optical fibers 408. As mentioned above, this technique, which is generally known as the 'index matching method', normally reduces optical power reflection at material boundaries. A portion of the optical power input from a given optical fiber 408 is typically reflected at the surfaces 412 and 424. This reflected power, when induced back into one of the optical fibers 408, causes degradation of the transmission system. As mentioned above, usually an AR coating is used to reduce reflections at material boundaries, however, reflected power reduction by AR coating is generally limited to about 30 dB. The index matching method is generally more effective than AR coating and, when applied, the reflection reduction is typically about 45 dB, when the temperature dependence of the refractive index of the materials is considered.

During construction, a microlens surface 416 of the microlens array substrate 404 is adjusted in relation to the optical fibers 408 such that the optical beams coincide with the optical axes of each of the microlenses 406. When proper alignment is achieved between the substrate 404 and the block 402, through the spacer 422, the substrate 404 and the spacer 422 are coupled together, preferably, with an index-matched optical adhesive 413A. In this configuration, the reflection from the microlens surface 416 of the microlens array substrate 404 can be reduced by adding an AR coating 413B to the microlens surface 416 for index matching to the spacer 422, if the difference in refractive index between the spacer 422 and the microlenses 406 is significant. In this configuration, the reflected optical power induced back into the optical fiber 408 is reduced due to the spacing, dictated by the width (dependent on the focal length of the microlenses 406) of the spacer 422, between the ends of the optical fibers 408 and the microlenses 406. As previously mentioned, the back surface 414, which is angle polished to reduce reflection, is coupled with an index-matched optical adhesive 415 to the first chip surface 169 of the optical chip 170.

The optical fiber collimator array 401B, whose construction is similar to that of the optical fiber collimator array 401A, is coupled at the back surface 444, which is angle polished to reduce reflection, with an index-matched optical adhesive 445, for example, to the second chip surface 167 of the optical chip 170. In the array 401B, an optical fiber array block 432 retains a plurality of optical fibers 438 and includes a first surface 442 that is coupled (e.g., with an index-matched optical adhesive 441) to a first surface 454 of an index-matched spacer 452. The spacer 452 includes a second surface 450 that is opposite the first surface 454. During construction of the array 401B, a microlens surface 446 of the microlens array substrate 434 is adjusted in relation to the optical fibers 438 such that the optical beams coincide with the optical axes of each of the microlenses 436.

When proper alignment is achieved between the substrate 434 and the spacer 452, they are coupled together, preferably, with an index-matched optical adhesive 443A. If desired, an AR coating 443B may also be provided on the surface 446. The refractive index of the spacer 452 is preferably matched to the refractive index of the core of the optical fibers 438.

The fiber array blocks 402 and 432, of FIG. 8, each include a plurality of channels for receiving the fibers 408 and 438, respectively, which are preferably retained within the blocks 402 and 432 with an adhesive. As shown, the microlens array substrates 404 and 434 are planar graded-index (GRIN) microlens array substrates that each include a plurality of GRIN microlenses 406 and 436. The microlenses 406 and 436 are spaced such that each microlens 406/436 receives/provides an optical signal from/to one of the optical fibers 408/438, when the device 400 is configured as an arrayed optical isolator. A suitable angle for the back surfaces 414 and 444 of the substrates 404 and 434 is about 1+/−0.5 degrees, for example, to achieve around a 60 dB reflection reduction for the device 400. It should be appreciated that a range of angles may provide suitable performance (e.g., 0.1 to 10.0 degrees from perpendicular to the optical axes of the optical powers that pass through the optical chip 170).

Figure 9:
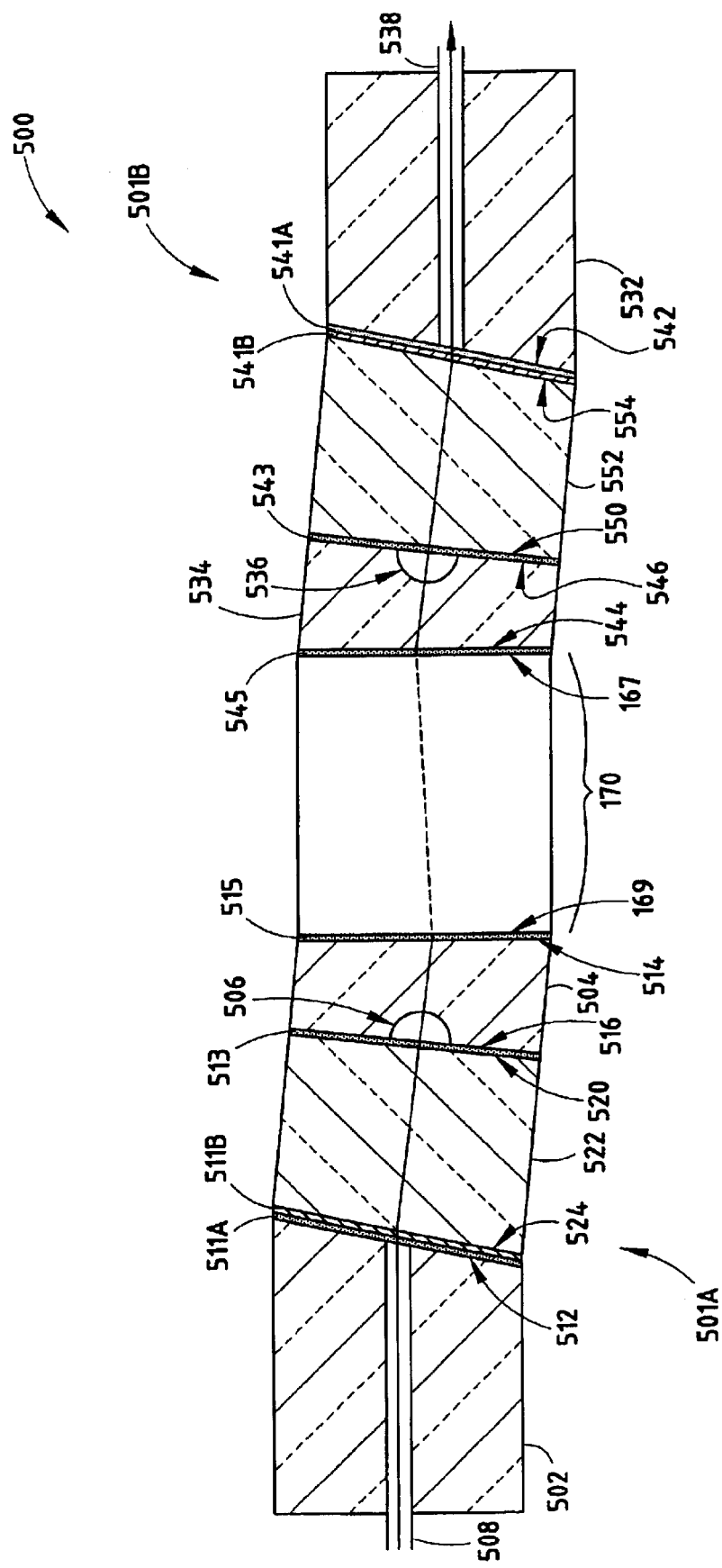
FIG. 9 is a cross-sectional view of another embodiment of an arrayed optical device of the present invention.

FIG. 9 illustrates a cross-sectional view of two optical fiber collimator arrays 501A and 501B that in combination with an optical chip 170 (see FIGS. 2A–2C) form an arrayed optical device 500, according to still another embodiment of the present invention. The optical chip 170 is coupled between the pair of optical fiber collimator arrays 501 A and 501 B, preferably, with an index-matched optical adhesive; after active optical alignment between the fiber collimator array 501A and the optical chip 170 and the fiber collimator array 501B. The optical device 500 is similar to the optical device 400, of FIG. 8, with the exception that the optical fiber array blocks include an angled surface and the spacers include a slanted surface, which tends to reduce reflections.

In the array 501A, an optical fiber array block 502 retains a plurality of optical fibers 508 and includes an angled surface 512 that is coupled (e.g., with an index-matched optical adhesive 511A) to a slanted surface 524 of a spacer 522. If desired, an AR coating 511B may also be provided on the slanted surface 524 (or on the angled surface 512). The ends of the fibers 508 are flush with the angled surface 512. The spacer 522 includes a second surface 520 that is opposite the slanted surface 524. During construction, the spacer 522 is adjusted in relation to the block 502 such that the working distance of the optical fiber collimator array fits for the configuration of the arrayed optical device 500. A microlens surface 516 of the microlens array substrate 504 is then adjusted in relation to the surface 520 such that the optical beams coincide with the optical axis of each of the microlenses 506.

When proper alignment is achieved between the substrate 504 and the spacer 522, they are coupled together, preferably, with an index-matched optical adhesive 513. The refractive index of the spacer 522 is preferably matched to that of the microlenses 506. A back surface 514 (which is preferably angled to reduce the reflection effect) of the substrate 504 is coupled, with an index-matched optical adhesive 515, to the first chip surface 169 of the optical chip 170.

The optical fiber collimator array 501B, whose construction is similar to that of the optical fiber collimator array 501A, is coupled, at a back surface 544 of a microlens array substrate 534, with an index-matched optical adhesive 545 to the second chip surface 167 of the optical chip 170. In the array 501B, an optical fiber array block 532 retains a plurality of optical fibers 538 and includes a first angled surface 542 that is coupled (e.g., with an index-matched optical adhesive 541A) to a slanted surface 554 of a spacer 552. If desired, an AR coating 541B may also be provided on the slanted surface 554 (or on the angled surface 542). The ends of the fibers 538 are flush with the angled surface 542. The spacer 552 includes a second surface 550 that is opposite the first surface 554. When proper alignment is achieved between the substrate 534 and the spacer 552, they are coupled together, preferably, with an index-matched optical adhesive 543. The refractive index of the spacer 552 is preferably matched to that of the microlenses 536. An angled back surface 544 of the substrate 534 is coupled, with, for example, an index-matched optical adhesive 545, to the second chip surface 167 of the optical chip 170.

The optical fiber array blocks 502 and 532 each include a plurality of channels for receiving the fibers 508 and 538, respectively, which are preferably retained within the blocks 502 and 532 with an adhesive. As depicted, the microlens array substrates 504 and 534 are planar graded-index (GRIN) microlens array substrates that each include a plurality of GRIN microlenses 506 and 536. The microlenses 506 and 536 are spaced such that each microlens 506/536 receives/provides an optical signal from/to one of the optical fibers 508/538, when the device 500 is configured as an arrayed optical isolator. A suitable angle for the angled surfaces 512 and 542 is about 8+/−0.1 degrees, for example, to get about a 60 dB reduction in reflection for the device 500. A suitable angle for the slanted surfaces 524 and 554 is adjusted such that the optical beams are perpendicular to the optical axis of microlenses 506 and 536 in the substrate 504 and 534, respectively. A suitable angle for the slanted surfaces 514 and 544 is about 1+/−0.6 degrees, for example, to get about a 60 dB reduction in reflection effect for the device 500.

Figure 10:
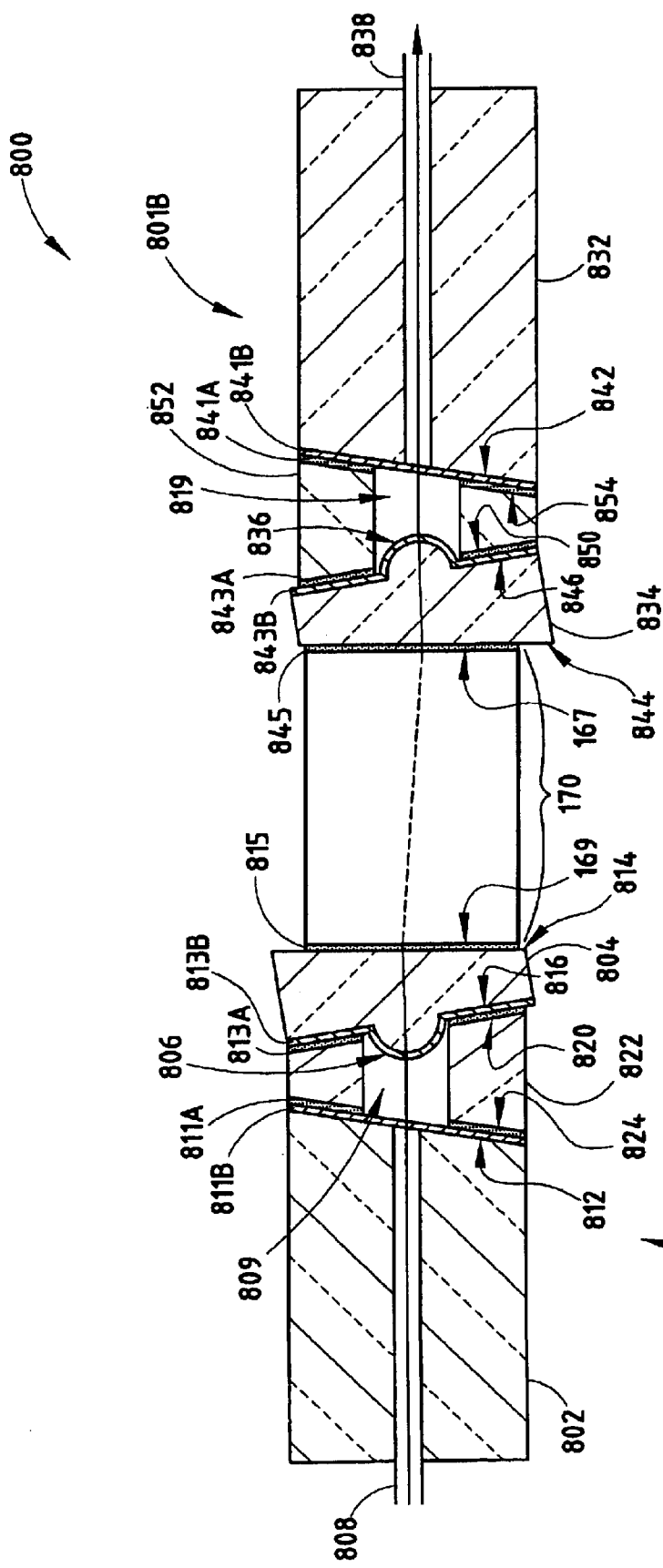
FIG. 10 is a cross-sectional view of a different embodiment of an arrayed optical device of the present invention.

FIG. 10 illustrates a cross-sectional view of two optical fiber collimator arrays 801A and 801B and an optical chip 170 (see FIGS. 2A–2C) that form an arrayed optical device 800, according to one embodiment of the present invention. The optical chip 170 is preferably coupled between the pair of optical fiber collimator arrays 801A and 801B with an index-matched optical adhesive; after active optical alignment between the fiber collimator array 801A and the optical chip 170 and the fiber collimator array 801B.

In the array 801A, a fiber array block 802 retains a plurality of optical fibers 808 and includes an angled surface 812 that is coupled (e.g., with an adhesive 811A) to a slanted surface 824 of a spacer 822. If desired, an AR coating 811B may be provided on the angled surface 812. The spacer 822 includes a second surface 820 that is opposite the slanted surface 824 and a hole 809. The relative angle between the surface 820 and the surface 824 of the spacer 822 is designed such that the optical beams passing through the hole 809 (i.e., air) are perpendicular to the surface 820. A microlens surface 816 of the microlens array substrate 804 is then adjusted in relation to the surface 820 such that the optical beams coincide with the optical axis of each of the microlenses 806. If desired, an AR coating 813B may also be provided on the microlens surface 816.

When proper alignment is achieved between the substrate 804 and the spacer 822, they are coupled together, preferably, with an adhesive 813A. Since the spacer 822 includes the hole 809, an index-matched optical adhesive is not required for the adhesives 811 A and 813A as the optical beams travel through air when passing from the fibers 808 to the microlenses 806. A sloped surface 814 of the substrate 804 that is not perpendicular to the optical beam is coupled with an index-matched optical adhesive 815 to a first chip surface 169 of the optical chip 170.

The optical fiber collimator array 801B, whose construction is similar to that of the optical fiber collimator array 801A, is coupled, at a sloped surface 844 that is not perpendicular to the optical beam of the microlens array substrate 834, with an index-matched optical adhesive 845, for example, to the second chip surface 167, of the optical chip 170. In the array 801B, an optical fiber array block 832 retains a plurality of optical fibers 838 and includes an angled surface 842 that is coupled (e.g., with an adhesive 841A) to a slanted surface 854 of a spacer 852. If desired, an AR coating 841B may also be provided on the angled surface 842. The spacer 852 includes a second surface 850 that is opposite the surface 854.

When proper alignment is achieved between the substrate 834 and the spacer 852, they are coupled together, for example, with an adhesive 843A. Since the spacer 852 includes a hole 819, an index-matched optical adhesive is not required for the adhesives 843A and 841A as the optical beams travel through air when passing from the microlenses 836 to ends of the fibers 838. If desired, an AR coating 843B may also be provided on the microlens surface 846.

The optical fiber array blocks 802 and 832, of FIG. 10, each include a plurality of channels for receiving the fibers 808 and 838, respectively, which are preferably retained within the blocks 802 and 832 with an adhesive, for example. The microlens array substrates 804 and 834 each include a plurality of refractive or diffractive microlenses 806 and 836. The microlenses 806 and 836 are spaced such that each microlens 806/836 receives/provides an optical signal from/to one of the optical fibers 808/838, when the device 800 is configured as an arrayed optical isolator. A suitable angle for the angled surfaces 812 and 842 and the sloped surfaces 824 and 854 is about 8+/−0.1 degrees. It should be appreciated that the angle range is a function of the desired minimum reflection. For example, if a center angle of 8.5 degrees is utilized, a wider angular range of about +/−0.6 degrees provides an acceptable reflection reduction. The relative angle relation between both surfaces of the spacers 822 and 852 is determined so the optical beam axis becomes parallel to the optical axis of the microlenses 806 and 836, respectively. The preferred range is about +/−0.5 degrees from the center angle.

Figure 11:
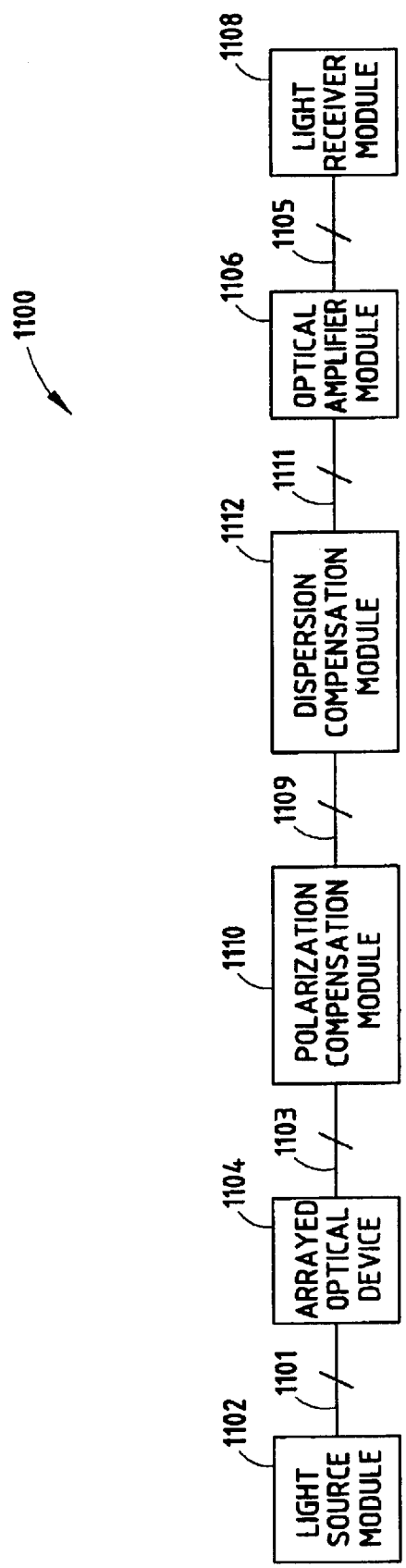
FIG. 11 is a block diagram of an exemplary optical system that utilizes an arrayed optical device, according to an embodiment of the present invention.

An exemplary optical system 1100, which includes an arrayed optical device 1104, according to the present invention, is depicted in FIG. 11. A light source module 1102, which includes a plurality of light sources, is coupled to the arrayed optical device 1104 by a plurality of optical fibers 1101. According to the present invention, the arrayed optical device 1104 is constructed according to any one of the embodiments of FIGS. 1A–10. As previously discussed, the arrayed optical device 1104 may perform functions such as isolation, recirculation, gain flattening and/or filtering of various optical signals, to name a few functions.

As shown in FIG. 11, the arrayed optical device 1104 is coupled to a polarization compensation module 1110, by a plurality of optical fibers 1103. The polarization compensation module 1110 is coupled to a dispersion compensation module 1112, by a plurality of optical fibers 1109. The dispersion compensation module 1112 is coupled to an optical amplifier module (including, for example, an erbium-doped fiber amplifier) 1106, by a plurality of optical fibers 1111. The optical amplifier module 1106 is coupled to a light receiver module 1108, by a plurality of optical fibers 1105. Alternatively, or in addition to, the arrayed optical device 1104 may be coupled between the polarization compensation module 1110, the dispersion compensation module 1112, or the optical amplifier module 1106 and the light receiver module 1108.

Suitable UV-cured index-matched optical adhesives are commercially available from NTT Advanced Technology Corporation (e.g., product number 9389 is suitable for a refractive index of 1.448). Preferably, the material for the optical fiber array block is selected to match the coefficient of thermal expansion (CTE) of the microlens array substrate material. That is, if the microlens array substrate is made of silica glass, the same material (silica glass) is one of the preferred choices for the material of the fiber array block.

In the case of a GRIN lens, a special glass material is generally required for the substrate to form microlenses at the top of the substrate. In the case of diffractive lenses or refractive lenses, a number of materials can be used, but silica glass or VYCOR® may be preferable in terms of index matching with the optical fiber core, as shown in FIGS. 3, 4, 5 and 10. This requirement for index matching greatly depends on the structure of arrayed fiber collimators. PYREX® is also generally acceptable for CTE matching with the fiber array block and the spacer if a slant fiber facet is introduced for reflection reduction as shown in FIGS. 4 and 5. In the case of the embodiment shown in FIG. 10, PYREX® is normally better for CTE matching with the fiber array block material and the spacer material.

When selecting a material for the fiber array block, CTE matching is the primary consideration. For CTE matching, PYREX® or silica glass is preferable, but the selection is not limited to these two materials and other materials can be utilized providing CTE matching is adequately performed. When a spacer is located between the fiber array block and the microlens array substrate, refractive index matching with the optical fiber core or with the microlenses is preferable. It is also desirable to CTE match the spacer with the fiber array block and the microlens array substrate for high property stability over a wide temperature range. Preferably, the spacer material is a glass material that is transparent in the applied wavelength range, except in the case of FIGS. 3, 4, 6 and 10, the spacer material does not have to be transparent in the applied wavelength range.

Accordingly, a number of arrayed optical devices have been described that can implement various optical chips (e.g., optical isolator and optical circulator chips). These arrayed optical devices are generally compact and advantageously allow various optical functions to be employed in-line.

It will become apparent to those skilled in the art that various modifications to the preferred embodiment of the invention as described herein can be made without departing from the spirit or scope of the invention as defined by the appended claims.

What is claimed is:

1. An arrayed in-line optical device, comprising:
   a first optical fiber collimator array, including:
   a first optical fiber array block configured to receive and retain a first plurality individual optical fibers which carry optical signals, the first optical fiber array block including a first block surface; and
   a first microlens array substrate coupled to the first optical fiber array block, the first microlens array substrate including a first plurality of microlenses formed on the substrate and integrated along a first microlens surface and a first substrate surface opposite the first microlens surface, wherein the optical signals from the first plurality of individual optical fibers are each collimated by a different one of the first plurality of integrated microlenses;
   a second optical fiber collimator array, including:
   a second optical fiber array block configured to receive and retain a second plurality of individual optical fibers which carry the optical signals, the second optical fiber array block including a second block surface; and
   a second microlens array substrate coupled to the second optical fiber array block, the second microlens array substrate including a second plurality of microlenses formed on the substrate and integrated along a second microlens surface and a second substrate surface opposite the second microlens surface, wherein the optical signals provided to the second plurality of individual optical fibers are each provided by a different one of the second plurality of integrated microlenses; and an optical chip coupled between the first and second microlens surfaces, the optical chip including a first chip surface and a second chip surface, wherein the first block surface is coupled to the first substrate surface and the second block surface is coupled to the second substrate surface by an index-matched optical adhesive, wherein the first and second block surfaces are angled and the first and second substrate surfaces are sloped at an angle in the range of about 4 to 12 degrees from perpendicular to the optical axes of the first and second plurality of individual optical fibers, respectively, wherein the pitch of the first and second plurality of integrated microlenses is within a range of about 125 to 2500 microns, wherein lens axes of the first and second plurality of integrated microlenses are tilted to the optical axis that passes through the first and second plurality of integrated microlenses at an angle in the range of about 0.1 to 5 degrees, and wherein the optical chip is inclined against the optical axis and the first and second chip surfaces are at an angle in the range of about 0.1 to 5 degrees from perpendicular to the optical axis of the optical powers that pass through the optical chip.

2. The arrayed optical device of claim 1, wherein an optical index of the adhesive between the first block surface and the first substrate surface matches that of one of the core of the first plurality of individual optical fibers and first substrate surface, the other of the first block surface and the first substrate surface including an anti-reflection (AR) coating for index-matching to the adhesive, and wherein an optical index of the adhesive between the second block surface and the second substrate surface matches that of one of the core of the second plurality of individual optical fibers and the second substrate surface, and the other one of the second block surface and the second substrate surface includes an anti-reflection (AR) coating for index-matching to the adhesive.

3. The arrayed optical device of claim 1, wherein the first and second plurality of microlenses are graded index (GRIN) lenses, wherein the first microlens surface is coupled to the first chip surface by an optical adhesive index-matching to one of the first microlens surface and the first chip surface, and the other of the first microlens surface and the first chip surface includes an anti-reflective (AR) coating for index-matching to the adhesive, and wherein the second microlens surface is coupled to the second chip surface by an optical adhesive index-matching to one of the second microlens surface and the second chip surface, and the other of the second microlens surface and the second chip surface includes an anti-reflection (AR) coating for index-matching to the adhesive.

4. The arrayed optical device of claim 1, further including:
a first spacer, the first spacer coupling the first optical fiber array block to the first microlens array substrate;
a second spacer, the second spacer coupling the second optical fiber array block to the second microlens array substrate;

a chip spacer configured to retain the optical chip and provide a air gap between the first chip surface and the first plurality of mocrolenses and another air gap between the second chip surface and the second plurality of microlenses, wherein the first spacer includes a first hole such that the optical signals provided by the first plurality of individual optical fibers pass through air before encountering the first microlens array substrate, wherein the second spacer includes a second hole such that the optical signals provided by the second plurality of individual optical fibers pass through air before encountering the second microlens array substrate, and wherein the first and second block surfaces, the first and second substrate surfaces, the first and second microlens surfaces and the first and second ship surfaces include anti-reflection (AR) coatings.

5. The arrayed optical device of claim 1, wherein the optical chip includes at least one of an optical isolator chip, an optical circulator chip, a gain flattening filter, a thin film filter, a variable optical attenuator, a polarization beam splitter, a wavelength plate, a prism, a grating, a mirror, a dynamically adjustable active optical material and polarizing material.

6. An arrayed in-line optical device, comprising:
a first optical fiber collimator array, including:
a first optical fiber array block configured to receive and retain a first plurality of individual optical fibers which carry optical signals, the first optical fiber array block including a first block surface;
a first spacer including a first front surface and a first back surface opposite the first front surface, wherein the first block surface is angled and the first front surface is slanted at a same angle in the range of about 4 to 12 degrees from perpendicular to the optical axis of the first plurality of individual optical fibers, and
wherein the first front surface is coupled to the first block surface by an index-matched optical adhesive; and
a first microlens array substrate including a first plurality of microlenses integrally formed on the substrate and along a first microlens surface, and a first substrate surface opposite the first microlens surface, wherein the optical signals from the first plurality of individual optical fibers are each collimated by a different one of the first plurality of integrated microlenses,
wherein the first plurality of microlenses are graded index (GRIN) lenses, and an optical index of the first spacer is similar to that of the first plurality of microlenses,
wherein the first microlens surface is coupled to the first back surface by another index-matched optical adhesive,
wherein angles of the first back surface and the first microlens surface are less than 5 degrees from perpendicular to the optical axis of the optical powers that pass through the first microlens array substrate, and
wherein the first substrate surface is sloped at an angle in the range of about 0.1 to 10 degrees from perpendicular to the optical axis of the optical powers that pass through the first microlens array substrate;
a second optical fiber collimator array, including:
a second optical fiber array block configured to receive and retain a second plurality of individual optical fibers which carry the optical signals, the second optical fiber array block including a second block surface;

a second spacer including a second front surface and a second back surface opposite the second front surface, wherein the second block surface is angled and the second front surface is slanted at a same angle in the range of about 4 to 10 degrees from perpendicular to the optical axis of the second plurality of individual optical fibers, and wherein the second front surface is coupled to the second block surface by an index-matched optical adhesive; and a second microlens array substrate including a second purality of microlenses integrally formed on the substrate and along a second microlens surface, and a second substrate surface opposite the second microlens surface, wherein the optical signals provided to the second plurality of individual optical fibers are each provided by a different one of the second plurality of integrated microlenses, wherein the second plurality of microlenses are graded index lenses (GRIN) and an index of the second spacer is similar to that of the second plurality of microlenses, wherein the second microlens surface is coupled to the second back surface by another index-matched optical adhesive, wherein angles of the second back surface and the second microlens surface are less than about 5 degrees from perpendicular to the optical axis of the optical powers that pass through the second microlens array substrate, and wherein the second substrate surface is sloped at an angle in the range of about 0.1 to 10 degrees from perpendicular to the optical axis of the optical powers that pass through the second microlens array substrate; and an optical chip coupled between the first and second substrate surfaces, the optical chip including a first chip surface and a second chip surface, wherein the first substrate surface is coupled to the first chip surface and the second substrate surface is coupled to the second chip surface, wherein a pitch of the first and second plurality of integrated microlenses is within a range of about 125 to 2500 microns, and wherein the optical chip is inclined against the optical axis and the first and second chip surfaces are at an angle in the range of about 0.1 to 10 degrees from perpendicular to the optical axis of the optical powers that pass through optical chip.

7. The arrayed optical device of claim 6, wherein an optical index of the adhesive between the first block surface and the first front surface matches that of one of the core of the first plurality of individual optical fibers and the first spacer, and the other of the first block surface and the first front surface includes an anti-reflection (AR) coating for index-matching to the adhesive, and wherein an optical index of the adhesive between the second block surface and the second front surface matches that of one of the core of the second plurality of individual optical fibers and the second spacer, and the other of the second block surface and the second front surface includes an anti-reflection (AR) coating for index-matching to the adhesive.

8. The arrayed optical device of claim 6, wherein the first substrate surface is coupled to the first chip surface by an optical adhesive index-matching to one of the first substrate surface and the first chip surface, and another one of the first chip surface and the first substrate surface includes an anti-reflection (AR) coating for index-matching to the adhesive, and wherein the second substrate surface is coupled to the second chip surface by an optical adhesive index matching to one of the second substrate surface and the second chip surface, and another one of the second chip surface and the second substrate surface includes an anti-reflection (AR) coating for index-matching to the adhesive.

9. The arrayed optical device of claim 6, wherein the optical chip includes at least one of an optical isolator chip, an optical circulator chip, a gain flattening filter, a thin film filter, a variable optical attenuator, a polarization beam splitter, a wavelength plate, a prism, a grating, a mirror, a dynamically adjustable active optical material and polarizing material.

10. An arrayed in-line optical device, comprising:
a first optical fiber collimator array, including:
a first optical fiber array block configured to receive and retain a first plurality of individual optical fibers which carry optical signals, the first optical fiber array block including a first block surface;
a first spacer including a first front surface and a first back surface opposite the first front surface, wherein the first front surface is coupled to the first block surface, and wherein the first block surface is angled and the first front surface is slanted at a same angle in the range of about 4 to 12 degrees from perpendicular to the optical axis of the first plurality of individual optical fibers; and a first microlens array substrate including a first plurality of microlenses integrally formed on the substrate and along a first microlens surface, and a first substrate surface opposite the first microlens surface, wherein the optical signals from the first plurality of individual optical fibers are each collimated by a different one of the first plurality of integrated microlenses, wherein the first microlens surface including anti-reflection (AR) coating is coupled to the first back surface, wherein the first spacer includes a first hole such that the optical signals provided by the first plurality of individual optical fibers pass only through air before encountering one of the first plurality of microlenses, wherein angles of the first back surface and the first microlens surface are less than about 5 degrees from perpendicular to the optical axis of the optical powers that pass through the first microlens array substrate, and wherein the first substrate surface is sloped at an angle in the range of about 0.1 to 10 degrees from perpendicular to the optical axis of the optical powers that pass through the first microlens array substrate;

a second optical fiber collimator array, including:
a second optical fiber array block configured to receive and retain a second plurality of individual optical fibers which carry the optical signals, the second optical fiber array block including a second block surface;
a second spacer including a second front surface and a second back surface opposite the second front surface, wherein the second front surface is coupled to the second block surface, and
wherein the second block surface is angled and the second front surface is slanted at a same angle in the range of about 4 to 12 degrees from perpendicular to the optical axis of the second plurality of individual optical fibers; and
a second microlens array substrate including a second plurality of microlenses integrally formed on the substrate and along a second microlens surface, and a second substrate surface opposite the second microlens surface, wherein the optical signals provided to the second plurality of individual optical fibers are each provided by a different one of the second plurality of integrated microlenses, wherein the second microlens surface including anti-reflection (AR) coating is coupled to the second back surface, wherein the second spacer includes a second hole such that the optical signals provided to the second plurality of individual optical fibers pass only through air after encountering one of the second plurality of microlenses, wherein angles of the second back surface and the second microlens surface are less than about 5 degrees from perpendicular to the optical axis of the optical powers that pass through the second microlens array substrate, and wherein the second substrate surface is sloped at an angle in the range of about 0.1 to 10 degrees from perpendicular to the optical axis of the optical powers that pass through the second microlens array substrate; and an optical chip coupled between the first and second substrate surface, the optical chip including a first chip surface and a second chip surface, wherein the first substrate surface is coupled to the first chip surface and the second substrate surface is coupled to the second chip surface, wherein the optical chip is inclined against the optical axis and the first and second chip surfaces are at an angle in the range of 0.1 to 10 degrees from perpendicular to the optical axis of the optical powers that pass through the optical chip, wherein a pitch of the first and second plurality of integrated microlenses is within a range of about 125 to 2500 microns, and wherein the first and second block surfaces include anti-reflection (AR) coating.

11. The arrayed optical device of claim 10, wherein the first and second plurality of microlenses are reflective lenses, and wherein the first and second back surfaces and the first and second microlens surfaces are perpendicular to the optical axis of the optical powers that pass through the first and second microlens array substrates, respectively.

12. The arrayed optical device of claim 10, wherein the first and second plurality of integrated microlenses are ones of graded index (GRIN) lenses or diffractive lenses and wherein the first and second back surface is slanted and the first and second microlens surface is tilted at a same angle in the range of about 0.1 to 5 degrees from perpendicular to the optical axis of the optical powers that pass through the first and second microlens array substrates, respectively.

13. The arrayed optical device of claim 10, wherein the first substrate surface is coupled to the first chip surface by an optical adhesive index-matching to one of the first substrate surface and the first chip surface, and another one of the first chip surface and the first substrate surface includes an anti-reflection (AR) coating for index-matching to the adhesive, and wherein the second substrate surface is coupled to the second chip surface by an optical adhesive index-matching to one of the second substrate surface and the second chip surface, and another one of the second chip surface and the second substrate surface includes an anti-reflection (AR) coating for index-matching to the adhesive.

14. The arrayed optical device of claim 10, further including;

a chip spacer configured to retain the optical chip and provide an air gap between the first chip surface and the first substrate surface and another air gap between the second chip surface and the second substrate surface, and wherein the first and second substrate surfaces and the first and second chip surfaces include anti-reflection (AR) coatings.

15. The arrayed optical device of claim 10, wherein the optical chip includes at least one of an optical isolator chip, an optical circulator chip, a gain flattening filter, a thin film filter, a variable optical attenuator, a polarization beam splitter, a wavelength plate, a prism, a grating, a mirror, a dynamically adjustable active optical material and polarizing material.

* * * * *